(12) United States Patent
Caselli et al.

(10) Patent No.: US 10,731,682 B1
(45) Date of Patent: *Aug. 4, 2020

(54) FLOOR ELEMENT FOR FORMING A FLOOR COVERING, A FLOOR COVERING AND A METHOD FOR MANUFACTURING A FLOOR ELEMENT

(71) Applicant: Daltile Corporation, Dallas, TX (US)

(72) Inventors: Claudio Caselli, Dallas, TX (US);
Rahul Patki, Richardson, TX (US);
Jan Eddy De Rick, Geraardsbergen (BE)

(73) Assignee: Daltile Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,818

(22) Filed: Jun. 28, 2019

Related U.S. Application Data

(63) Continuation of application No. 16/278,560, filed on Feb. 18, 2019.

(51) Int. Cl.
*E04B 2/00* (2006.01)
*F16B 5/00* (2006.01)
(Continued)

(52) U.S. Cl.
CPC .............. *F16B 5/0016* (2013.01); *E04B 1/82* (2013.01); *E04C 2/26* (2013.01)

(58) Field of Classification Search
CPC ..... E04F 15/087; E04F 15/082; E04F 15/085; E04F 15/02405; E04F 15/04;
(Continued)

(56) References Cited

U.S. PATENT DOCUMENTS

| 5,931,447 A | 3/1999 | Butschbacher et al. |
| 9,896,581 B2 | 2/2018 | Morizur |

(Continued)

FOREIGN PATENT DOCUMENTS

| EP | 2369090 B1 | 9/2011 |
| EP | 3404165 A1 | 11/2018 |

(Continued)

OTHER PUBLICATIONS

International Search Report and Written Opinion for PCT Application No. PCT/US2020/17662 dated Jun. 9, 2020.

*Primary Examiner* — Chi Q Nguyen
(74) *Attorney, Agent, or Firm* — Troutman Sanders LLP; James E. Schutz; Chris N. Davis

(57) ABSTRACT

A floor element for forming a floor covering, wherein the floor element comprises a board having edges provided with coupling elements adapted to cooperate with coupling elements of an adjacent similar floor element in the floor covering, wherein the coupling elements comprise at least one male part and at least one female part, the male part being positioned along a first edge and protruding outwardly beyond an upper edge at the first edge, the female part being positioned along a second edge and extending inwardly beyond an upper edge at said second edge to form a recess for at least partially receiving the male part, wherein the recess comprises an inlet opening having a vertical breadth, wherein the ratio between the vertical breadth and the thickness of the board is more than 0.4, and wherein the board has a thickness comprised from 3.2 mm to 6 mm.

18 Claims, 4 Drawing Sheets

(51) Int. Cl.
*E04B 1/82* (2006.01)
*E04C 2/26* (2006.01)

(58) Field of Classification Search
CPC ........... E04F 2201/0115; E04F 2201/00; E04F 2201/0161; Y10T 428/2848
USPC ........ 52/588.1, 582.1, 592.1, 592.2; 428/354
See application file for complete search history.

(56) References Cited

U.S. PATENT DOCUMENTS

| | | | |
|---|---|---|---|
| 2002/0057942 A1 | 5/2002 | Hamberger et al. | |
| 2003/0084636 A1 | 5/2003 | Pervan | |
| 2004/0031225 A1* | 2/2004 | Fowler | B32B 3/02 |
| | | | 52/578 |
| 2004/0031226 A1* | 2/2004 | Miller | E04F 15/04 |
| | | | 52/588.1 |
| 2004/0255541 A1* | 12/2004 | Thiers | B32B 3/30 |
| | | | 52/578 |
| 2006/0278046 A1 | 12/2006 | Gargano | |
| 2007/0220822 A1* | 9/2007 | Permesang | E04F 13/08 |
| | | | 52/392 |
| 2007/0289236 A1* | 12/2007 | Choi | E04F 13/0803 |
| | | | 52/311.2 |
| 2009/0041987 A1* | 2/2009 | Schitter | B32B 3/06 |
| | | | 428/172 |
| 2009/0155612 A1* | 6/2009 | Pervan | B32B 21/02 |
| | | | 428/498 |
| 2010/0018149 A1* | 1/2010 | Thiers | E04F 15/02 |
| | | | 52/588.1 |
| 2010/0300032 A1 | 12/2010 | Kang | |
| 2012/0317911 A1* | 12/2012 | Huang | E04F 15/02 |
| | | | 52/309.1 |
| 2013/0014891 A1* | 1/2013 | Vandevoorde | B44C 5/04 |
| | | | 156/277 |
| 2013/0104485 A1* | 5/2013 | Meersseman | B27N 7/00 |
| | | | 52/578 |
| 2014/0134402 A1 | 5/2014 | Pallon et al. | |
| 2014/0349084 A1 | 11/2014 | Patki et al. | |
| 2015/0121793 A1* | 5/2015 | Segaert | B29C 70/081 |
| | | | 52/506.01 |
| 2015/0211238 A1 | 7/2015 | Pervan et al. | |
| 2016/0288447 A1 | 10/2016 | Cordeiro | |
| 2017/0350140 A1 | 12/2017 | Bergelin et al. | |
| 2018/0258651 A1* | 9/2018 | Meersseman | B32B 7/02 |

FOREIGN PATENT DOCUMENTS

| | | |
|---|---|---|
| JP | 2012026260 A | 2/2012 |
| KR | 20110064350 A | 6/2011 |
| WO | 2004097141 A1 | 11/2004 |
| WO | 2008097860 A2 | 8/2008 |
| WO | 2009142365 A | 11/2009 |
| WO | 2010072704 A1 | 7/2010 |
| WO | 2017013501 | 1/2017 |

* cited by examiner

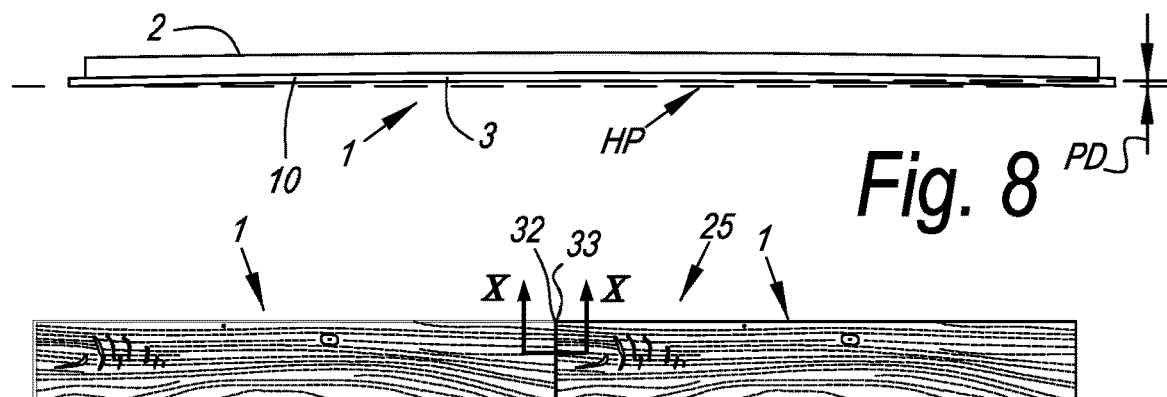
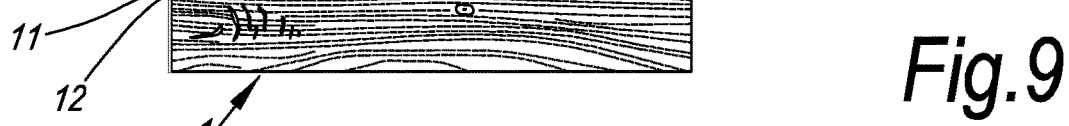
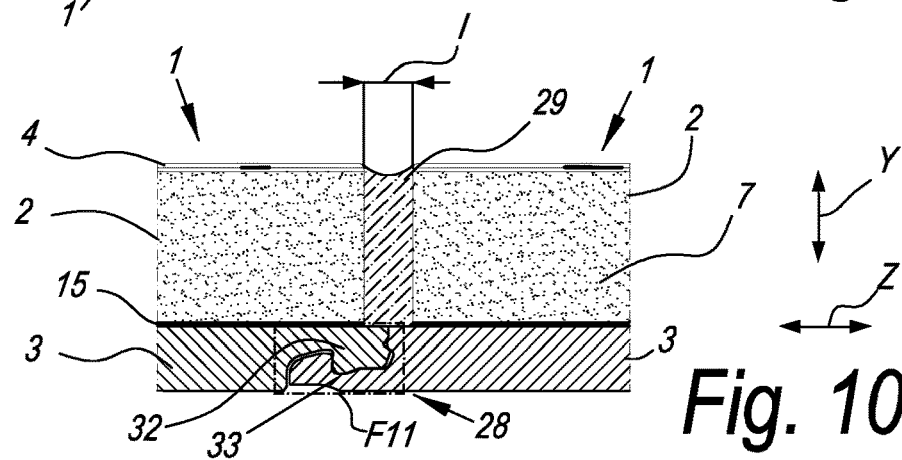
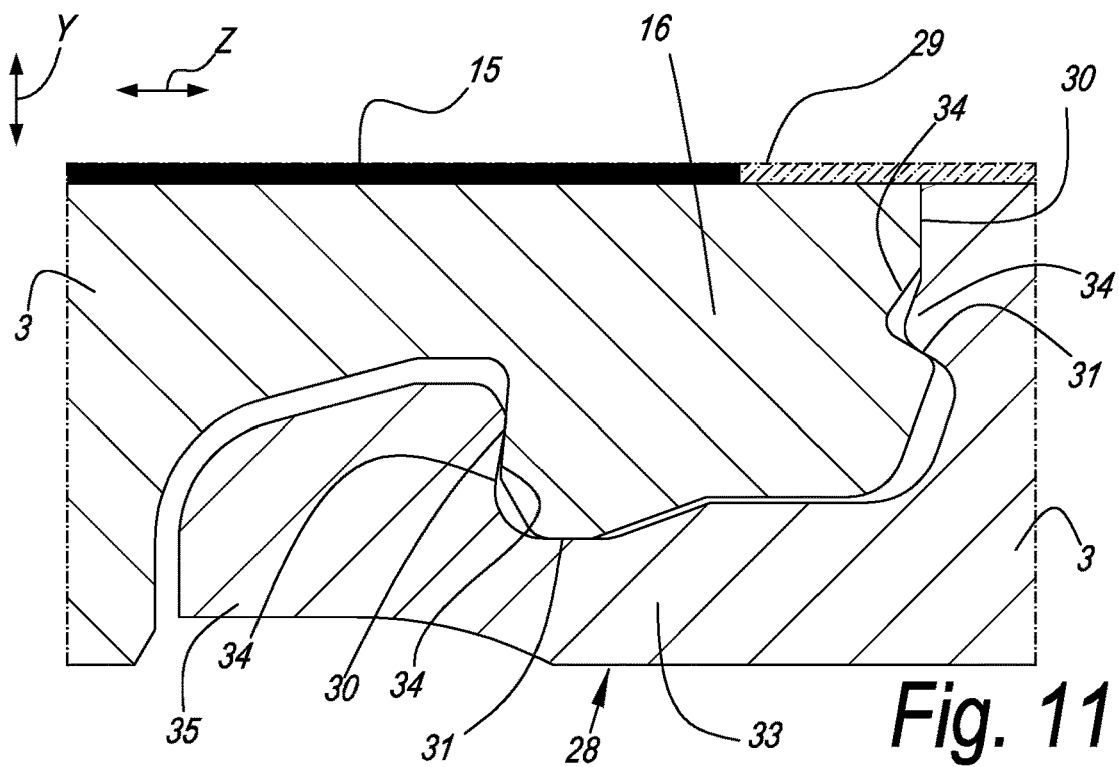

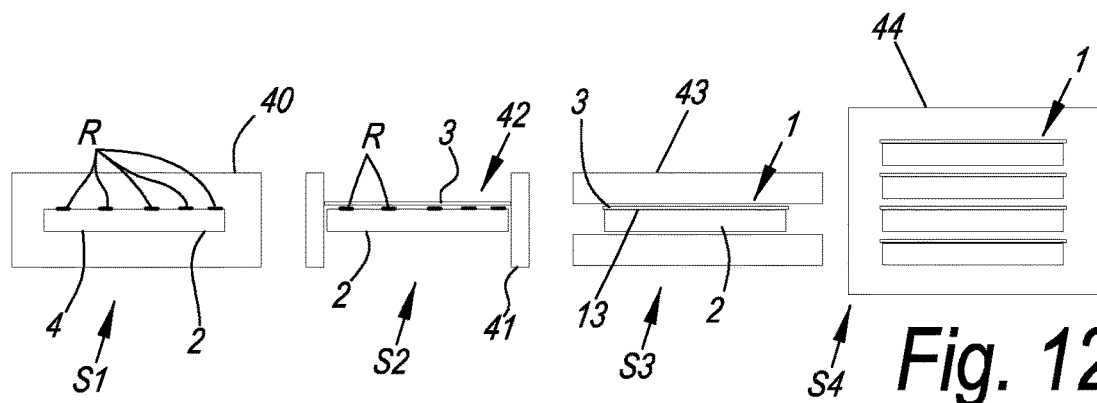
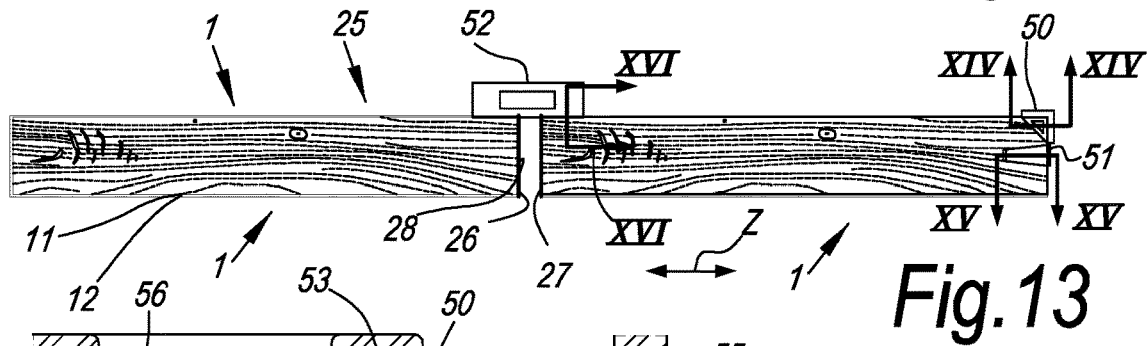
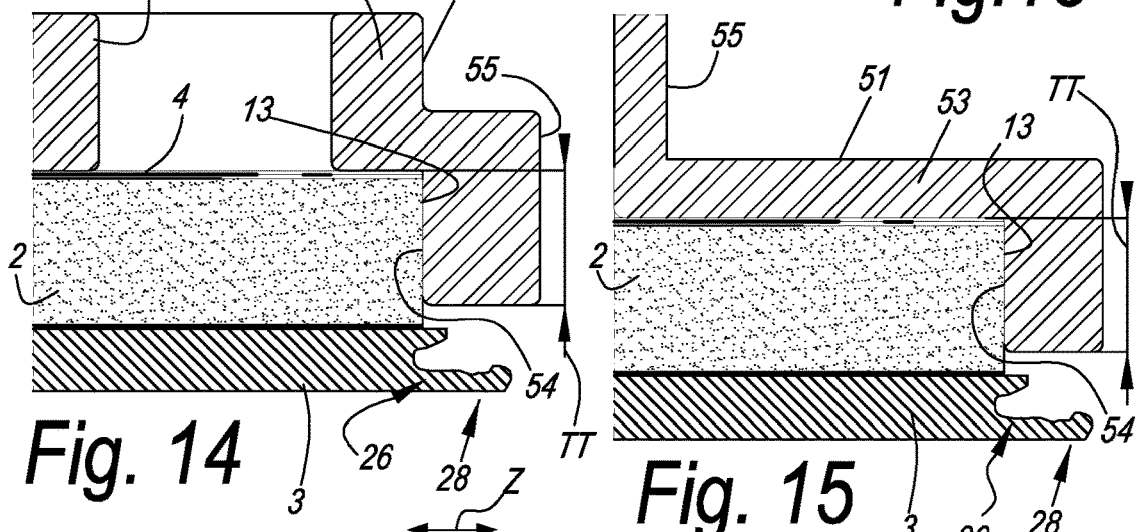
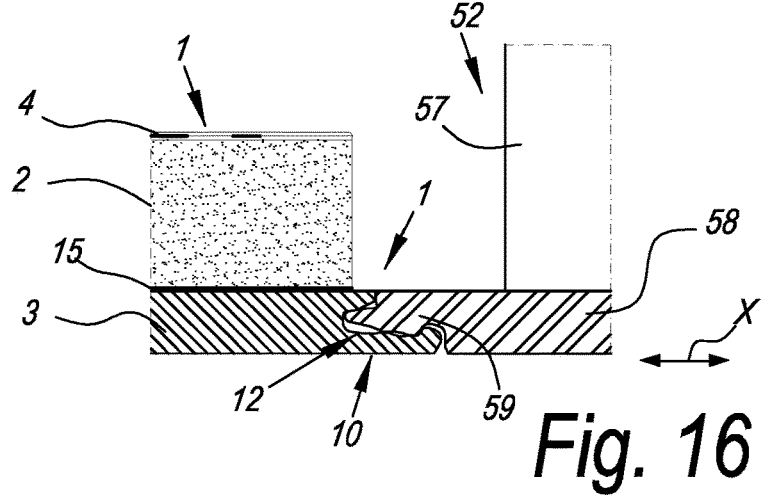

FLOOR ELEMENT FOR FORMING A FLOOR COVERING, A FLOOR COVERING AND A METHOD FOR MANUFACTURING A FLOOR ELEMENT

CROSS-REFERENCE TO RELATED APPLICATIONS

This application is a continuation of, and claims priority to, U.S. patent application Ser. No. 16/278,560, filed on 18 Feb. 2019, the disclosure of which is herein incorporated by reference in its entirety.

BACKGROUND

1. Technical Field

The present invention relates to a floor element for forming a floor covering, a floor covering, and a method for manufacturing a floor element.

More particularly, the invention is related to a floor element for forming a floor covering, wherein this floor element comprises a board having coupling edges having edges provided with coupling elements adapted to cooperate with coupling elements of an adjacent similar floor element in said floor covering and wherein the coupling elements comprise at least one male part and at least one female part.

2. Background

An example of said floor element is described in WO 97/47834 A1. Said kind of floor elements has become more and more important in the recent years thanks to the easiness of installation provided by the coupling elements. In fact, a floor covering can be quickly installed by non-professional installer and, in case of restoration, without the necessity of removing the pre-existing floor covering. Furthermore, thanks to the coupling elements, the floor covering is substantially flat and well leveled. In fact, since the floor elements are not glued to the subfloor there are no glue accumulations below the floor elements that can affect the leveling of the floor covering.

Due to the material properties and/or to the manufacturing process, the floor elements may be bowed and have a substantially convex shape in such a way that, for example, a central portion of the floor element is disposed at an upper level with respect to the extremal portion. In this case it could be difficult to couple together the coupling elements of the floor elements, especially in case the floor elements are disposed in an offset configuration. In fact, in this case, for example, it would be difficult, if not impossible, to insert the male part of the central portion of a first floor element into the female part of the extremal portion of a second adjacent element, since they are on different heights. Moreover, in this coupled condition the couple elements are highly solicited, and they could break or damage.

This problem is enhanced when the floor element comprises a board made of a rigid material and/or when the floor element comprises a decorative layer provided above said board and wherein the decorative a decorative layer is made of a brittle material such as natural stone, glass or sintered ceramic materials like porcelain, earthenware or the like. The decorative layer can be, for example, a ceramic tile. Examples of said floor elements are shown in WO 2004/097141 and WO 2008/097860.

The present invention aims in the first place to provide an alternative floor element, which, in accordance with several of its preferred embodiments, is directed to solve one or more of the problems arising in the state of the art.

BRIEF SUMMARY

In one aspect, the present invention provides a floor element for forming a floor covering, wherein the floor element comprises a board having edges provided with coupling elements adapted to cooperate with coupling elements of an adjacent similar floor element in said floor covering wherein the coupling elements comprise at least one male part and at least one female part said male part being positioned along a first edge and protruding outwardly beyond an upper edge at said first edge, said female part being positioned along a second edge and extending inwardly beyond an upper edge at said second edge to thereby form a recess for at least partially receive the male part, wherein said recess comprises an inlet opening having a vertical breadth, with the characteristic that the ratio between the vertical breadth and the thickness of the board is more than 0.4 mm, wherein said board has preferably a thickness comprised between 3.2 and 6 mm, wherein the floor element comprises a decorative layer provided above the board, wherein said decorative layer comprises a ceramic tile and wherein said decorative layer is mounted on the board in such a way that when two floor elements are in a coupled condition said intermediate distance is available between the edges of adjacent decorative layers.

In another aspect, the present invention provides a floor element for forming a floor covering, wherein the floor element comprises a ceramic tile, a board disposed below the ceramic tile and an intermediate layer between the board and the ceramic tile, wherein the board comprises coupling elements adapted to cooperate with coupling elements of an adjacent similar floor element in said floor covering, wherein the intermediate layer comprises resin, wherein said resin compresses the ceramic tile.

In another aspect, the present invention provides a floor covering comprising a plurality of adjacent floor elements, wherein at least one of the floor elements comprises a ceramic tile, a board disposed below the ceramic tile and an intermediate layer between the board and the ceramic tile, wherein the board comprises edges having coupling elements adapted to cooperate with coupling elements of an adjacent similar floor element in said floor covering, wherein the intermediate layer comprises a resin, wherein said resin compresses the ceramic tile, and wherein the floor covering comprises a grout filling an intermediate distance separating the decorative layers of the floor elements.

These and other objects, features and advantages of the present invention will become more apparent upon reading the following specification in conjunction with the accompanying description, claims and drawings.

BRIEF DESCRIPTION OF THE DRAWINGS

The following non-limiting and exemplary figures are provided to show several possible forms of embodiments according to the disclosure.

FIG. 8 show a schematic side view of a floor element of FIG. 1;

FIG. 9 on a smaller scale shows a top plane view of a floor covering comprising a plurality of the floor elements according to a second embodiment of the invention;

FIG. 10 on a larger scale shows a cross section along the line X-X of FIG. 9;

FIG. 11 on a larger scale shows a view on the area F11 indicated on FIG. 10;

FIG. 12 shows some steps of a method for manufacturing a floor element.

FIG. 13 shows a top plane view of a kit for installing the floor elements for forming the floor covering.

FIG. 14 on a larger scale shows a cross section of a first embodiment of a first tool of the kit along the line XIV-XIV of FIG. 13.

FIG. 15 on a larger scale shows a cross section of an alternative embodiment the first tool of the kit along the line XV-XV of FIG. 13.

FIG. 16 on a larger scale shows a cross section of the second tool along the line XVI-XVI of FIG. 13.

DETAILED DESCRIPTION

Figure 1:
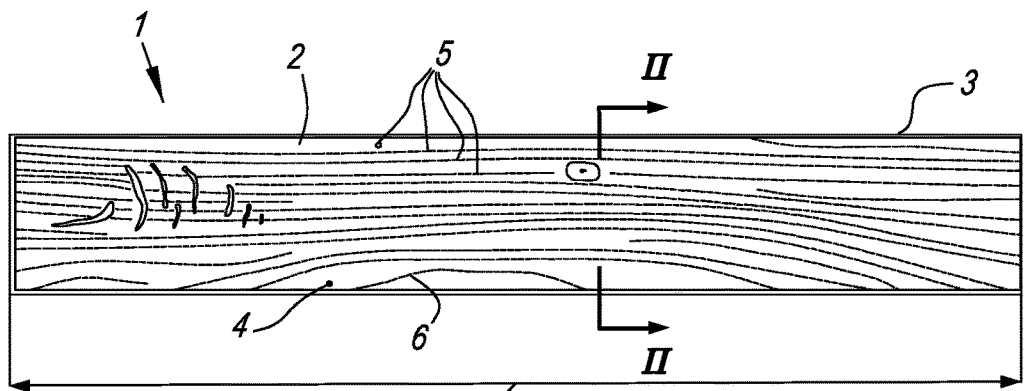
FIG. 1 shows a top view of a first embodiment of a floor element of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

Embodiments of the Invention

Thus, the present invention, according to a first independent aspect, relates to a floor element for forming a floor covering, wherein the floor element comprises a board having edges provided with coupling elements adapted to cooperate with coupling elements of an adjacent similar floor element in said floor covering wherein the coupling elements comprise at least one male part and at least one female part said male part being positioned along a first edge and protruding outwardly beyond an upper edge at said first edge, said female part being positioned along a second edge and extending inwardly beyond an upper edge at said second edge to thereby form a recess for at least partially receive the male part, wherein said recess comprises an inlet opening having a vertical breadth, with the characteristic that the ratio between the vertical breadth and the thickness of the board is more than 0.4, preferably more than 0.45, more preferably more than 0.5, even more preferably about 0.53. In other words, the vertical breadth is at least 0.4 times the thickness of the board, preferably more than 0.45 times, more preferably more than 0.5 times, even more preferably about 0.53 times. Preferably, the ratio between the vertical breadth and the thickness of the board is comprised between 0.4 and 0.7, preferably between 0.5 and 0.6. A female part of the coupling element having an enlarged vertical inlet opening provides the possibility to engage the male part with the female part of two adjacent floor elements even in case of highly bended floor elements. In fact, in this way a male part can engage an adjacent female part even if it is at a different height. This is particularly the case of an offset installation wherein the central portion of one floor element is at an upper height with respect of the extremal portion of an adjacent floor element. Moreover, this characteristic provides for an eased insertion of the male part into the female part so that subsequently, once complete engagement between the coupling elements is reached, they can still lock to prevent vertical and/or horizontal movements between the floor elements.

It is to be noted that the vertical breadth of said inlet opening is preferably measured substantially on the vertical plane on which lies the upper edge of said first edge.

It is also to be noted that preferably the vertical breadth of the inlet opening may correspond to the maximum breadth of the recess of the female part.

According to a preferred embodiment of the invention, the vertical breadth is above 1.6 mm, preferably above 1.8 mm, more preferably above 2 mm. In this way it would be possible to couple two floor elements having a planarity deviation of 1 mm or more measured between the center and the ends of the edge, even in a 50/50 offset installation.

Moreover, between the upper border of the inlet opening of the recess and the upper edge of said first edge, is provided a distance. The ratio between said distance and the thickness of the board can be below 0.2, preferably below 0.15. For example, said ratio can be comprised between 0.2 and 0.1. A reduced distance between the inlet opening and the upper edge increases the chances of easily inserting the male part into the recess of the female part in case the male part is disposed at an upper level with respect to the recess. For example, said distance can be below 0.9 mm, preferably below 0.6 mm. For example, said distance can be comprised between 0.9 and 0.4 mm.

According to an embodiment of the invention, the recess may comprise a first portion close to the inlet opening and a second portion close to the bottom of said recess. Preferably, said first portion is larger than the second portion, wherein with larger it is meant with respect with the vertical dimension of the recess. Preferably said first portion may extends toward the bottom of the recess for a deepness that is at least 0.3 times the whole maximum deepness of the recess, i.e. the sum of the deepness of the first and of the deepness of the second portion. Preferably, the deepness of the first portion is at least 0.4 times, more preferably at least 0.5 times (i.e. at least the half) of the whole maximum deepness of the recess. Said deepness shall be measured starting from the inlet opening, i.e. from substantially form a vertical plane parallel to the longitudinal edge and on which lies the upper edge of said first edge. Therefore, the deepness of the first portion is measured starting from the inlet opening until the transition between the first and the second portion. Whereas the whole maximum deepness of the recess is measured starting from the inlet opening until bottom of the recess. Having a so deep first portion improves the engagement between the male and the female part. The first portion is enlarged to pilot the male part into the female part and the second portion is narrower in order to provide a vertical locking. Therefore, making the first portion deeper improves the efficacy of this piloting effect in particular when the coupling is difficult because of unevenness of the subfloor or in case of planarity deviation of the floor element. According to a preferred embodiment said deepness of the first portion is more than 0.5 mm, preferably more than 0.75 mm, for example more than 1 mm. For example, said deepness of the first portion is comprised between 0.5 and 1.5 mm, preferably between 0.75 and 1.25 mm. Preferably said first portion comprises an inclined upper surface descending toward the bottom of the recess. More preferably said inclined upper surface is inclined with respect to the horizontal of an angle comprised between 30° and 50°, for example about 45°. This would improve the abovementioned piloting effect of the first portion. The transition between the first and the second portion substantially coincides with a change in the inclination of said inclined upper surface, in particular when said angle diminishes.

It is to be noted that, said male and female part in a connected state of two similar floor elements engage into each other to create a mechanical coupling between the respective edges, preferably resulting in a locking between said edges in vertical and/or one or more horizontal directions. Under "mechanical coupling", a coupling is to be understood that allows adjacent floor elements to be coupled each other without the need for glue or the like.

As used herein, the terms "horizontal" and "vertical" are basically expressed regarding a floor covering installed on a surface which is considered to be horizontal in its general meaning. Thus, when used regarding a single floor element which is a substantially flat element provided with a main plane, the terms "horizontal" and "vertical" are to be considered respectively equivalent to the terms "parallel with respect to the main plane of the floor element/installed floor elements" and "perpendicular with respect to the main plane of the floor element/installed floor elements".

Furthermore, in a coupled condition of two of said adjacent floor elements, the coupling elements cooperate and preferably form locking surfaces limiting the mutual movement of said floor elements in vertical and/or one or more horizontal directions. Preferably, in a coupled condition of two adjacent floor elements, first locking surfaces are formed limiting the mutual movement of said floor elements in a direction perpendicular to the coupled edges and in a substantially horizontal plane. Furthermore, in said coupled condition, second locking surfaces are formed limiting the mutual movement of said floor elements in a substantially vertical direction. Thanks to this solution, the floor elements can fluently be installed without the occurrence of unacceptable height differences between adjacent floor elements. Moreover, the floor elements are solidly coupled to each other to improve the fatigue behavior of the floor covering. Further, by limiting relative movement of the floor element, it is possible to reduce the step noise effect, i.e. reduce the noise generated at every step.

According to the preferred embodiment of the invention, the male part and female part can be disposed substantially along the whole length of the related edge, for example, substantially defining the related edge. For example, according to this embodiment, the male and the female parts, can be basically shaped as a tongue and a groove that substantially runs through the whole length of the related mutually opposite edges. Preferably, the male part is positioned at a first edge of the floor element and at least the female part is positioned at a second opposite edge of the floor element.

Alternatively, the male part and the female part may extend over a limited length portion of the related edge, wherein such limited length is smaller than the whole length of the related edge itself, preferably smaller than half the length of the related edge. In accordance with this possibility, the edges preferably comprise sections free from said male part and said female parts. Geometries for coupling parts in accordance with this alternative embodiment include cooperating male and female parts which in a top plan view are dovetail-shaped or male and female parts which in a top plan view resemble the connections of jigsaw puzzles.

In some embodiments the coupling elements are configured so that, in a coupled condition, a pretensioned state is established between the coupling element. In other words, the coupling element are configured so that in the coupled condition they are elastically deformed thereby exerting a counter reaction each-other. Thanks to this solution the coupling between the floor element is strengthen and the coupling itself helps the waterproofing of the floor covering. Anyway, according to the preferred embodiment of the invention the coupling elements are configured so that, in a coupled condition, the coupling is free from pretension so that the coupling is simplified, and a lower force needs to be exerted by the operator. That is to say that, in the coupled condition the coupling elements are in an undeformed condition. Moreover, also the coupling movement of the coupling element, i.e. the relative movement between the coupling elements that allows the mechanical coupling, occurs without deformation of the coupling elements. For example, in some embodiments a play is established between the coupling elements so that tiny movements between the coupling elements in a vertical and/or horizontal direction are admitted. For example, the dimension of the male part on a plane orthogonal to the respective edge is equal or slightly smaller than the dimension of the female part on the same plane. Preferably said play is larger than 0.01 mm and lower than 0.15 mm, more preferably said play is comprised between 0.03 and 0.1 mm.

The coupling elements are configured to allow realizing a coupling by means of a movement of one floor element with respect to another adjacent floor element. Such movement may be a translational motion in a downward, e.g. vertical, direction, a translational motion in a horizontal direction, e.g. perpendicular to the edges or an angling motion around a horizontal axis parallel to the edges. Therefore, the respective motion then preferably results in the aforementioned male and female parts of adjacent floor elements becoming mutually engaged. Thereto, the coupling elements may be construed in accordance with several different possibilities, of which here below two are shortly described. According to a first possibility, said coupling elements are configured for being coupled each other by means of an angling motion around a horizontal axis parallel to the edges. According this first possibility, it is also preferred that the coupling element are configured for being coupled by means of a translational motion in a horizontal direction, e.g. perpendicular to the edge.

According to said first possibility the male and female parts are respectively shaped in form of tongue and groove, wherein the tongue projects outwardly beyond its respective edge in a horizontal direction and the groove projects inwardly with respect to the respective edge in a horizontal direction. As already indicated above the tongue and the groove are configured in such a way that in a coupled condition of said tongue and groove the first and second locking surfaces are formed to limit relative movements of the floor elements in vertical and horizontal direction, and wherein said horizontal direction is perpendicular to the edge.

According to the preferred embodiment, the tongue comprises a horizontal extending lip and a downward projecting hump. As a consequence, in this embodiment, the groove has a horizontal recess, for receiving the lip of the tongue, and an upward oriented hollow portion, for receiving the hump of the tongue, so that tongue can be fitted into the groove. The horizontally extending lip extends beyond the upper edge of the longitudinal edge. Moreover, the horizontally extending lip has a section tapered toward its tip. According to the preferred embodiment the horizontally extending lip has a maximum thickness comprised between 0.20 and 0.4 times the thickness of the board, preferably is 0.33 times the thickness of the board. In other words, the ratio between the maximum thickness of the horizontally extending lip and the thickness of the board is comprised between 0.25 and 0.4 and preferably is about 0.33. Within the scope of the present application the maximum thickness is the maximum thickness of the portion of the lip that extends beyond the upper edge, for example it is measured substantially in correspondence of a vertical plane, parallel to the longitudinal edge, on which lies the upper edge. According to the preferred embodiment the maximum thickness of the lip is comprised between 1 and 1.6 mm, preferably 1.3 mm.

It is to be noted that according to this preferred embodiment the horizontal recess comprises one or more of the features described above with reference to the recess of the female part of the coupling element. Therefore, it is evident that by providing an horizontal recess having the enlarged inlet opening the angling movement of the male part is eased, in particularly when the board is bowed.

It is also preferred that in a coupled condition the tongue fits into the groove in such a way that a horizontal inoperative space is established between the tip of the tongue, in particular of the lip thereof, and the bottom of the groove, in particular of the recess thereof. It is also preferred that in a coupled condition the tongue fits into the groove in such a way that a vertical inoperative space is established is established between the lower surface of the tongue, in particular of the lip thereof, and the groove, in particular the recess thereof. There is thus provided a tongue having a lip narrower that the groove so that the angling movement for coupling the floor elements is definitely improved. It is also preferred that in the coupled condition the downward projecting hump of the tongue contacts the hollow portion of the groove, and the upper surface of the tongue contacts the groove. In particular, it is preferred that the lower surface of the tongue contacts the groove only in correspondence of the hump. Thus, said second contact surfaces for preventing the vertical mutual movement of the floor element is provided, while coupling by angling movement is simplified because the lower contact is formed only in correspondence of the hump the tongue and not of the lip thereof.

Moreover, according to the preferred embodiment of this first possibility, in the coupled condition of the tongue and the groove is formed a play. Said play allows tiny movements in a vertical and/or horizontal direction, preferably in the horizontal direction. The play is such that the tongue and the groove can be coupled each other without being deformed.

As a consequence of this, the effort exerted by the operator who wants to install the floor elements is significantly reduced, this is particularly important since the weight of the decorative layer if on one hand complicates the installation operations, on the other hands helps the locking between the floor elements. Therefore, a slightly slack coupling due to the play is admitted and helpful for improving the easiness of installation. Preferably said play is larger than 0.01 mm and lower than 0.15 mm, more preferably said play is comprised between 0.03 and 0.1 mm.

According to a second possibility, said coupling element are configured for being coupled by means of a translational motion in a downward, e.g. vertical, direction. According to this second possibility the coupling elements comprise an upward-directed lower hook-shaped part which is situated on one edge, as well as a downward-directed upper hook-shaped part, which is situated on the opposite edge. Lower hook-shaped part defines an upward directed cavity forming a female part, whereas the upper hook-shaped part defines a downward-directed lip forming a male part. Once in a coupled position the downward-directed lip and the upward-directed cavity form the first locking surface for limiting mutual movement in a horizontal direction, e.g. perpendicular to the edge. Preferably the upper hook-shaped part and the lower hook shaped part, more preferably respectively the lip and the cavity, are configured so that in the coupled condition the second locking surface are formed to limit the mutual movement of the floor elements in the vertical direction. More particularly, the upper hook-shaped part and the lower hook shaped part are configured so that two sets of said second locking surfaces are formed, for example on opposite of the male part and the female part. Preferably, both the upper hook-shaped part and the lower hook shaped part comprise undercut portions so that in the coupled condition the first and/or the second locking surfaces are formed to limit the mutual movement of the floor elements. Moreover, the coupling elements according to said second possibility are configured to be deformed during the coupling movement. Preferably, the lower hook shaped part comprises a flexible lever portion configured to be deformed by the coupling off the upper hook-shaped part lower hook shaped part so that by means of said deformation it is possible the coupling of the undercut portions.

It is noted that the floor element may comprise the same coupling elements, i.e. according to the first or to the second possibility, on all its edges. In particular, according to the preferred embodiment, the floor element comprises coupling elements according to the first possibility on all its edges. In this case the vertical locking between the floor elements can be very strong so to keep the levelling of the floor covering and the mechanical coupling can be particularly effective in killing the step sound. According to alternative embodiments of the invention, the floor element can comprise coupling elements of different shape or of different dimension on different edges. For example, a floor element can comprise coupling elements according to the first possibility on a first couple of opposite edges, e.g. in case of rectangular floor element the long edges, and coupling elements according to the second possibility on a second couple of opposite edges, e.g. the short edges. In other words, a rectangular floor element can comprise coupling elements adapted for being coupled by means of an angling movement on the long edges and coupling elements adapted for being coupled by means of a translational motion in a downward direction on the short edges. Due to such motion, the coupling between the floor elements is simplified. In fact, thanks to the angling movement, for example provided by the tongue and groove, it is easy to align the long edges of the floor elements thereby simplifying the positioning and providing a strong coupling in both vertical and horizontal direction between the long edge, while the short edges can be easily coupled by means of a translational motion in a downward direction as a direct consequence of the coupling between the long edges. This is particularly advantageous in case of a heavy decorative layers, in fact once the coupling elements according to the first possibility, e.g. the tongue and the groove on the long sides, are coupled it is sufficient to let the floor element lay in the horizontal position to realize the mechanical coupling of the coupling elements according to the second possibility, e.g. on the short edges without the need of hammering or beating the floor element itself. This happens also in case the coupling elements according to the second possibility are deformed during the coupling since the weight of the decorative layer may be sufficient to cause said deformation.

Preferably, the board is preferably made of a material adapted to be provided with coupling elements and/or made of a waterproof material and/or made of a compressible material. According to the preferred embodiment, the board is made of a polymeric material. Polymeric materials have good mechanical properties in combination with relative low cost and low weight and, further, they provide for an impermeable and a sound reducing board.

Preferably, the board is made of a thermoplastic polymeric material, preferably with a glass transition temperature (Tg) below 100° C., for example of PVC (polyvinyl chloride) or polyurethane, more particularly thermoplastic polyurethane. Examples of thermoplastic material are PVC, polyethylene, polypropylene, polyethylene terephthalate. Forming the board out of a material with a relatively low glass transition temperature leads to a board which is easily compressed at room temperature. Compression is desirable in many respects. For example, a possible thermal expansion of the board may be partially or wholly suppressed by the more rigid or stiffer decorative layer and/or reinforcing element that holds the material of the board in its original dimension. Compression is also interesting for the design of the coupling elements and allows for a certain adaptation to unevenness of the subfloor, which in its turn prevents air chambers in between the board and the subfloor that may amplify walking noises. Compression is also preferable for floor element having a significant planarity deviation since the coupling elements can more easily adapt each other in case of differences in heights.

Between the thermoplastic materials PVC is a preferred choice for the board due to the balance between processability, physical and mechanical properties and cost.

The board can be made either of a flexible or, preferably, of a rigid PVC, wherein rigid PVC comprises an amount of plasticizer lower than 15 phr, and flexible PVC comprises an amount of plasticizer of 15 phr or higher, preferably more than 20 or more than 25 phr. Within the context of the present description, "rigid" means that the board, taken alone, bends under the own weight thereof less than 10 cm per meter and still better less than 5 cm per meter, whereas the "flexible" means that the board, taken alone, bends under the own weight thereof more than 10 cm per meter. The board may also comprise a high amount of filler materials, such as chalk, e.g. more than 30 wt % or more than 60% wt of such filler materials. The fillers add weight to the board and make the board very effective in killing the transit of walking sound to lower quarters. The content of filler should be preferably limited to below 60 wt %, preferably below 50 wt % in order to not excessively increase brittleness of the board. Rigid PVC provides for a board having good dimensional stability when exposed to variation of the temperature. In other words, the expansion of the board, when exposed to high temperature, is limited thereby providing a good stability of the floor. A board made of flexible PVC has a lower dimensional stability but is more easily compressed and therefore its tendency to expand could be suppressed at least to some extent by other components of the floor elements.

According to the preferred embodiment, the board is made of a rigid PVC. Preferably the rigid PVC may comprise a flexural modulus between 1.5 and 3.5 GPa, for example, approximately 2.6 GPa. The board may also comprise a flexural strength between 60 and 90 MPa, for example approximately 76 MPa. Moreover, the board may comprise a compressive strength between 40 and 70 MPa, for example approximately 56 MPa. In fact, inventors have found that the rigidity of the board helps absorbing the impact energy thereby improving the impact strength.

According to an embodiment of the invention the board can be designed in such a way to compensate to variations of shape and/or dimension due, for example, to variations of the temperature. For example, the board can be formed of a plurality of separated elements, for example strips, or can comprises transversal notches separating adjacent portions of the board thereby permitting the expansion of said portions without affecting the global stability of the floor.

Furthermore, the board has preferably a thickness comprised between 3.2 and 6 mm, more preferably about 4. For example, the preferred embodiment of the invention provides for a board made of rigid PVC and showing a thickness of 4 mm, thereby representing a good solution in terms of thermal stability, noise reduction, low weight and low cost.

Although according to the preferred embodiment the board comprises of polymeric material, it is not excluded that according to alternative embodiments the board may comprise other materials. In fact, with the aim of the present invention the substrate may comprise any material suitable to be used as board in furniture, wall covering or floor panel. It is also preferable that the substrate is waterproof. For example, the substrate can comprise a cement-based material, or a mineral based material.

In case of cement-based material the substrate may comprise a fiber containing cement board, for example portland cement board. With fiber containing cement board is intended a board containing at least a cement and a fibrous material, bonded together, for example pressed together to form the board. The fibers can be for example polymeric fibers or natural fibers. The adhesion is preferably carried out under pressure either in a cold or warm condition.

In case of mineral-based material the substrate may comprise a fiber containing mineral board. With fiber containing mineral board is intended a board containing at least a mineral and a fibrous material, bonded together, for example pressed together to form the board. The mineral can comprise silica, calcium carbonate or gypsum and/or magnesium oxide. The fibers can be for example polymeric fibers or natural fibers. The adhesion is preferably carried out under pressure either in a cold or warm condition.

According to a preferred embodiment of the invention, the floor element comprises a decorative layer provided above the board. Preferably the decorative layer is made of a material that is different from the material of the board. It is to be noted, the according to this preferred embodiment the coupling elements may be, preferably, wholly formed in said board. Moreover, the decorative layer can be attached to the by means of an adhesive, preferably a resin which is described hereinafter.

The decorative layer can be made of any kind of hard or brittle material, such as ceramic, natural stone, concrete, glass or glass-ceramic material. Said brittle materials show high wear resistance, impermeability and cleanability. With brittle material is intended a material that breaks without significant plastic deformation. In particular, for the scope of said patent application, with the term brittle material is intended a material that of its own (if not bonded to a board and without any reinforcing element) has an impact strength lower than 1.68 J (corresponding to a ball falling from a height lower than 762 mm) according to the ball impact test described herein. Impact strength for flooring can be determined by means of a steel ball impact test. According to this test the impact strength is measured by dropping a steel ball on the floor element from a certain height, if the floor element does not break the height is increased until a height is reached where the steel ball breaks the floor element. The steel ball has a weight of 225.5 grams and a diameter of 38.1 mm (1.5 inches). The impact strength is expressed in terms of the maximum attainable height from which the steel ball, when dropped on the floor element does not break the floor element. The higher the drop height, the higher is the impact strength. The impact strength can be expressed in Joule (J), i.e. the energy of the steel ball when hitting the surface of the floor element.

According to the preferred embodiment the decorative layer comprises a ceramic body, for example made of porcelain, red body ceramic, stoneware, earthenware, or other sintered ceramic powders. Preferably, the decorative layer is a ceramic tile or slab. With "ceramic tile" an element is meant with a substantially flat body consisting of baked minerals, such as clay, and preferably with a fired decorative top surface, preferably but not necessarily, on the basis of a glaze. The glaze has also the effect of preventing the resin permeating the decorative layer from reaching the upper surface of the decorative layer thereby affecting the appearance of the floor element.

According to a preferred aspect of the invention the decorative layer may comprise, at least in correspondence of its lower surface, an open porosity adapted to allow the adhesive or resin to permeate the decorative layer itself, thereby improving the bonding with the board. Thus, according to a preferred embodiment of the invention the decorative layer comprises an apparent porosity between 0.1% and 10% determined according to ASTM C373, more preferably between 2% and 8%, for example 6%. Since, the pores of the material, especially the closed pores t may represent weak points of the material itself, it is preferable that the decorative layer comprises an apparent porosity lower than 15%, preferably lower than 10% measured according to ASTM C373. Furthermore, the decorative layer may preferably have a volume of the open pores comprised between 0.01 cc (cubic centimeter) and 1 cc, more preferably between 0.10 cc and 0.90 cc, for example 0.60 cc. The abovementioned ranges and values of apparent porosity provide the optimum balance between intrinsic mechanical properties of the decorative layer and the resin permeability thereof thereby providing the best bonding between the resin without affecting the intrinsic mechanical properties of the decorative layer. In this way the pores are big enough to be filled by the resin while at the same time they are sufficiently small to don't compromise the mechanical properties of the decorative layer. As it will be further described subsequently, by permeating the lower surface of the decorative layer with the resin it is possible improve the impact strength thereof since the resin seals the pores forming a sort of polymeric-ceramic composite material and the transfer of the stress generated during the impact is significantly improved. This result is particularly impressive since the apparent porosity range is peculiar for ceramic tiles that are used mainly for wall covering or for floor covering in residential installations, but for floor covering of commercial installations where the traffic is more intense and higher mechanical properties are required, it generally is preferred the use of ceramic tiles having lower apparent porosity. Surprisingly, the inventors have found that by permeating the lower surface of the decorative layer, a tile usually destined to wall covering or low traffic environment can achieve properties and behavior typical for high traffic floor installation. It is to be noted that said porosity and the reinforcing mechanism of the resin is effective not only for ceramic tile, which constitutes the preferred embodiment of the invention, but for any material suitable for the decorative layer as previously indicated.

According to a first preferred possibility for forming the ceramic tile of the decorative layer, the ceramic tile is made of porcelain. Porcelain is a ceramic material obtained by firing at high temperature, for example around 1200° C., a mixture of relatively pure raw material comprising clays, kaolin, quartz, feldspar, calcium carbonate and/or other mineral raw materials. Porcelain shows a very low apparent porosity, preferably below 1%, for example 0.3% measured according to ASTM C373. Porcelain has a volume of the open pores comprised between 0.01 cc (cubic centimeter) and 0.1 cc, more preferably between 0.1 cc and 0.6 cc. Said porosity values are such that the porcelain material shows relatively high mechanical properties and it can efficiently bond to the boars via a resin or adhesive.

According to a second preferred possibility for forming the ceramic tile of the decorative layer, the ceramic tile made of a red body ceramic tile. Red body ceramic is a ceramic material obtained by firing at high temperature, for example around 1150° C., of a raw material mixture comprising clays, kaolin, quartz, feldspar, calcium carbonate and/or other mineral raw materials. Red body ceramic may be fired at lower temperature with respect to porcelain thereby showing a higher porosity and water absorption rate. Moreover, red body ceramic is obtainable starting from a raw material mixture that is cheaper than the raw material mixture that is necessary to obtain porcelain. For example, red body ceramic may comprise an apparent porosity comprised between below 10%, preferably between 2% and 8%, for example 6% measured according to ASTM C373. Red body ceramic may have a volume of the open pores comprised between 0.10 cc and 0.90 cc, for example 0.60 cc.

The inventors have found that the interaction between the resin or adhesive and the decorative layer is improved if the decorative layer comprises a lower surface that is substantially flat. The lower surface is the non-visible surface (in use) that is opposite to the upper decorative surface of the decorative layer. Usually, the lower surface of a ceramic tile comprises ribs that can have a thickness up to 1 mm, but the inventors have found that for the application of the resin to the lower surface itself it is preferred to use a decorative layer that is free from said ribs. Furthermore, according to a preferred embodiment of the invention the lower surface of the decorative layer, in particular of the ceramic tile, is free from backwash. The backwash is a thin coating basically comprising an engobe that is applied to the lower surface of the ceramic tile and has the function of preventing the material of the non-fired ceramic tile from sticking onto the rollers of the firing kiln. Since the backwash comprises an engobe that is at least partially composed by a glass composition, during firing of the ceramic tile it melts permeating the pores of the ceramic tile that are open on the lower surface thereof so that the lower surface itself becomes impermeable. Thus, the inventors have found that a decorative layer made of a ceramic tile having a lower surface free from backwash provides a better resin permeability of the lower surface of the ceramic tile. It is also possible that the backwash covers a portion of the lower surface of the decorative layer that is lower to the 20%, preferably the 10% of said lower surface. In this way the backwash doesn't totally impermeabilize the lower surface allowing the resin to permeate said porosity of the decorative layer, while on the other hand helps the manufacturing of the decorative layer preventing the material of the non-fired ceramic tile from sticking onto the rollers of the firing kiln.

The decorative layer has an upper face comprising a décor. The décor can be provided with a variety of textures, designs and colors. In a preferred embodiment, the décor simulates a natural product, such as natural stone or wood. Preferably, the décor is at least partially formed by a print. The print is preferably realized by means of digital printing, such as inkjet printing, although screen printing, rotogravure, flexography or off-set printing is not excluded. According to a variant, the décor is at least partially formed by uniformly colored base material or by a mix of colored base materials.

The decorative layer can comprise a background coating covering at least partially its upper surface and adapted to receive the décor on its top, for example adapted to receive the print on its top. The background coating can be white, beige, brown or of any color suitable to receive a décor on its top. In the case that the decorative layer is made of a ceramic material, the background layer preferably comprises at least a glaze covering the upper surface of the ceramic body.

The decorative layer can also comprise a protective coating covering at least partially its upper surface and being adapted to be placed above the décor. The protective coating can be transparent or translucent. The protective coating can be used in combination with the background coating. In the case that the decorative layer is made of a ceramic material, the protective layer preferably is a glaze.

It is noted that the decorative layer may comprise density as expressed by surface weight of at least 10 kg/sqm, preferably 15 kg/sqm, for example above 19 kg/sqm. High density of the decorative layer may improve installation of the floor covering and in particular a vertical locking of between the floor elements as it is described below in more detail. It is also preferred that the decorative layer comprises a density as expressed by surface weight of less than 35 kg/sqm, preferably below 30 kg/sqm, for example below 25 kg/sqm. In fact, an excessively heavy decorative layer may affect the maneuverability of the floor element as well as complicating the packaging and the transportation thereof.

Preferably, the decorative layer has a thickness comprised between 4 and 15 mm, for example above 6 mm, preferably above 7 mm, for example about 8 or about 10 mm. Thus, the thickness of the floor element is lower than 20 mm, preferably 18 mm or lower, more preferably 13 mm or lower. In this way, the thickness of the resulting floor element is relatively thin, so that the impact of the floor in the environment is reduced, especially in case of restoration of existing flooring. Moreover, in this way, the surface weight of the floor element is limited so that the packaging, the transport and the installation are made easier. For example, the surface weight of the floor element is at least 18 kg/sqm, preferably at least 21 kg/sqm. For example, in a preferred embodiment wherein the decorative layer is made of porcelain and comprises a thickness of 8.5 mm and wherein the board is made of PVC and comprises a thickness of 4 mm, the surface weight of the floor element is approximately 24 kg/sqm. Thank to this is found a good balance between economy of transport and packaging and easiness of installation. In fact, a weight above said limits may help the coupling between two floor elements, especially improving a vertical locking between them.

The decorative layer can be made of any shape, for example a squared, rectangular or hexagonal shape. In the preferred embodiment, the floor elements are rectangular and oblong in shape, and are preferably provided with a wood grain or stone print depicting wood grain lines or stone veins extending globally in the longitudinal direction of the rectangular decorative layer.

Moreover, the decorative layer, especially in the case that is made of a ceramic material, may be slightly bowed so that there may be the same issues due to irregularities of the subfloor. The larger the side of the decorative layer is, the larger said bending is so that is preferred that the floor element, and the decorative layer, comprise a reduced superficial area. The bowing of the decorative layer is also reflected into the bowing of the whole floor element and, as already introduced, it may complicate the coupling of the floor element. Therefore according to the preferred embodiment the decorative layer comprises a planarity deviation below 1.5 mm, preferably below 1 mm, even more preferably below 0.8 mm. Within the context of the present application, the planarity deviation is defined as the vertical height difference between the extremal portion and the central portion of an edge of the decorative layer. In particular within the scope of the present invention the planarity deviation is measured by placing the extremes of one edge of the decorative layer, on a horizontal plane and measuring the distance between the middle of the edge from that horizontal plane. Moreover, within the context of the present application the planarity deviation is preferably measured considering the lower surface of the decorative layer. In fact, the board glued below the decorative layer acquires at least the same planarity deviation.

The floor element may comprise any dimension, although it is preferred that it comprises a superficial area of less than 1.5 sqm, preferably less than 1 sqm, more preferably less than 0.4 sqm. For example, the floor element, and in particular the decorative layer, comprises an edge having a maximum length of less than 1.5 m, preferably less than 0.9 m. In fact, the floor elements are destined to lay on a subfloor that may have irregularities like depressions or bumps that can affect the floor covering installation, the impact resistance and also the fatigue resistance of the floor elements. For floor elements having a reduced area it is reduced the effect of said irregularities as well as the probability of encounter said irregularities. Moreover, it should to be considered that the planarity deviation is often a function of the length of the edges of the floor element, and in particular the longer is the edge the higher could be the planarity deviation. Therefore, to limit the length of the edges can prevent an excessive planarity deviation of the floor element that can complicate the coupling.

Preferably, the board has a shape basically corresponding to the decorative layer, however, preferably, with one or more portions extending beyond the decorative layer. The board may also comprise one or more recesses extending underneath the decorative layer. The board preferably is a coherent element, wherein the board preferably covers the majority, i.e. at least 50 percent, of the lower surface of said decorative layer. Preferably the board covers 80 percent or more of the lower surface of the decorative layer. According to a variant, the board comprises a plurality of separate adjacent board portions, in which case said plurality of board portions preferably covers at least 50 percent of the lower surface, or even 80 percent or more thereof. In a coupled condition of two of said floor elements preferably an intermediate distance is available between the respective upper edges of adjacent floor elements. Preferably, the decorative layer is mounted on the board in such a way that when the floor elements are in a coupled condition said intermediate distance is available between the edges of adjacent decorative layers, while the edges of the underlying board are coupled to each other by means of the available coupling elements. Thanks to this solution slight dimensional variations of the decorative layer of adjacent tiles may be tolerated. In the cases where the decorative layer is formed by one or more ceramic tiles, both unrectified tiles and rectified tiles may be selected, wherein unrectified tiles are preferred since they are less expensive than the rectified ones. Even when rectified tiles would be selected, an intermediate distance of at least 1.5 millimeter, for example around 3 millimeters or more is preferred in case of unrectified tiles. In general, with brittle decorative layers, direct contact between the edges of the decorative layers of adjacent floor elements is best to be prevented in order to minimize the risk of breaking off edge portions upon installation, or upon use of the floor covering. The prevention of direct contact between the edges of the decorative layers also prevents squeaking noises from generating when the floor is walked upon. Further some decorative layers and/or boards may expand or contract due to thermal variation. The available intermediate distance prevents that such expansion and contraction affect the stability of the floor. For example, the decorative layer is mounted on the board in such a way that is centered onto an upper surface of the board, e.g. each upper edge of the board extends beyond the edge of the decorative layer of the same predetermined distance. For example, said predetermined distance is the half of the intermediate distance between the respective upper edges of adjacent floor elements in the coupled condition. This solution is especially preferred in case unrectified tiles are used because it simplifies the positioning of tiles that may have slightly different dimensions on boards having the same dimensions.

In accordance with a preferred aspect of the invention the floor element comprises an intermediate layer disposed between the decorative layer and the board. The intermediate layer preferably comprises an adhesive or a resin that bonds together the decorative layer and the board. According to the preferred embodiment the decorative layer comprises a resin, for example a thermosetting resin or thermoplastic resin. Examples of thermosetting resin are epoxy, polyurethane, unsaturated polyester, vinyl ester, cyanoacrylate. Examples of thermoplastic resin are hot melt, polyester thermoplastic, acrylic resin, vinyl etc. Preferably the resin is a rigid resin. In fact, the inventors have found that a rigid resin, rather than flexible resin, improves the transfer of the impact energy between the layers. In particular, according to the preferred embodiment of the invention the intermediate layer comprises an epoxy resin. It is also preferred that the epoxy is a bicomponent resin, i.e. a thermosetting resin obtained by curing at low temperature (for example at room temperature) a mixture of two components, namely a resin and a hardener. When the two components of the resin are mixed together the curing reaction starts so that it is not necessary to activate the cure by providing external energy, like heat, UV or EB radiation. Said external energy could be optionally provided in order to accelerate the curing process.

Moreover, according to a preferred embodiment, the resin material permeates a lower surface of the decorative layer. In other words, the resin material penetrates the open porosity of the decorative layer. The inventors have found that, thanks to this solution, the impact resistance of the floor element, more particularly of the decorative layer of ceramic, is highly increased, so that, even with the mechanical locking between such floor elements, the impact strength achieves or even exceeds the impact strength of the traditional elements installed by means of adhesives. Moreover, in this way it is possible to improve the impact resistance of the floor element without the necessity to add further rigid or resilient reinforcing elements like rubber layer, fiberglass or metal plates. In fact, the resin permeating the pores of the decorative layer substantially improves the transmission and dissipation of the impact stress through the floor element so that a lower portion of said energy is absorbed by the decorative layer improving the impact resistance thereof. Since it is not necessary to add rigid reinforcing elements, the resulting floor element is lighter and thinner. Moreover, the resin constitutes a hinder to the propagation of cracks in the decorative layer itself. Furthermore, in case of superficial cracks of the decorative layer, the intermediate layer keeps the decorative layer itself coherent, and preferably compacted, thereby disguising the visual appearance of the superficial cracks.

According to the preferred embodiment the resin comprises epoxy resin. The inventors have found that the epoxy resin shows very good affinity both with the decorative layer and PVC where PVC is a material forming the board. In fact, the inventors have found that PVC shows a good affinity with epoxy resin so that it is possible to form a very good bonding and interphase between the board and the intermediate layer. This interphase improves the transfer of impact energy between the layers of the floor element thereby improving impact strength thereof. Moreover, inventors have found that thanks to the interaction between PVC and epoxy resin it is possible to reduce or avoid any delamination effect between the board and the intermediate layer, and this has the consequence of improving the fatigue resistance of the floor element. In fact, since the board and the intermediate layer may not be separated from each other because of the delamination, the floor element can maintain substantially unaffected its mechanical properties even after prolonged solicitation, thereby showing good fatigue strength. Moreover, according to the preferred embodiment the decorative layer comprises a ceramic tile which could be either a porcelain tile or a red body ceramic tile. In fact, a porcelain tile as such, i.e. when not bonded to a board and without the resin permeating the decorative layer, shows an impact resistance of 0.73 J, whereas a floor element comprising a decorative layer made of porcelain bonded above a board by means of an intermediate layer comprising a resin that permeates the lower surface of the decorative layer can reach an impact resistance up to 3.37 J. Usually a red body ceramic tile as such, i.e. when not bonded to a board and without the resin permeating the decorative layer, shows an impact resistance of 0.67 J, whereas a floor element comprising a decorative layer made of red body ceramic bonded above a board by means of an intermediate layer comprising a resin that permeates the lower surface of the decorative layer can reach an impact resistance up to 5.62 J. It is to be noted that a red body ceramic tile as such has an impact resistance lower than a porcelain tile as such, whereas a floor element according to the invention and comprising red body ceramic shows a significantly higher resistance than a floor element comprising porcelain.

According to a preferred aspect of the invention the resin comprises a viscosity at 20° C. below 1000 Pas, preferably below 800 Pas, more preferably below 600 Pas, for example approximately 400 Pas. Within the scope of the invention viscosity means the viscosity of the uncured resin, for example the viscosity of the mixture of the two components before the completion of the curing, i.e. during the so-called pot life. In fact, the inventors have found that if the resin is sufficiently fluid, during its application onto the back of the decorative layer, it can permeate the pores thereof in order to extremely improving the bonding between the intermediate layer and the decorative layer. In practice the when the resin permeates the pores of the decorative layer it substantially forms a "composite polymer-ceramic layer" that significantly improves the impact strength of the floor element. Moreover, thanks to the intermediate herein described it is possible improve the impact resistance and fatigue behavior of relatively thin decorative layer. It is noted that, according to a preferred solution the resin is in a substantially liquid state during the manufacturing process of the floor element. It is possible that the resin is in a pasty or gel state during the manufacturing process, for example showing a thixotropic behavior in order to reach a sufficient fluidity to permeate the pores of the decorative layer under predetermined process conditions, for example during a pressing step. According to an embodiment of the invention the intermediate layer may comprise two or more different resins. For example, the intermediate layer may comprise a first resin for impregnating the pores of the decorative layer and a second resin for bonding together the decorative layer and the board. According to said embodiment the first resin may be a rigid resin for reinforcing the decorative layer and the second resin may be a for example a soft or elastomeric resin that provides a cushioning effect in case of impact.

Preferably the resin may also show a shrinkage, after curing, comprised between 0.5 and 15% for example between 1 and 10%. The inventors have surprisingly found that a resin showing this characteristic during its curing retires significantly. Since during curing the resin is the only component of the floor element that shrinks, it compresses the decorative layer disposed above thereby reinforcing the decorative layer itself. This effect can be further enhanced if the resin permeates the lower surface of the decorative layer. In fact, if the resin of the intermediate layer permeates the lower surface of the decorative layer the strong bonding within the two layers helps the compressive action of the resin. Moreover, this reinforcing mechanism due to the compressive action of the resin may join the reinforcing action due to the filling of the pores and the improved stress transfer mechanism toward, if present, the board.

This compressive effect is evident by measuring the bowing of the floor element, i.e. the planarity deviation thereof. Usually, the planarity deviation of the decorative layer is reflected into the bowing of the whole floor element and, as already introduced, it may complicate the coupling of the floor element. The inventors have found that after curing of the resin the floor element shows a planarity deviation which is higher than the planarity deviation of the sole decorative layer before application of the resin. This means that the decorative layer is compressed and reinforced. Therefore, according to the preferred embodiment, after gluing, the board comprises a planarity deviation below 1.5 mm, preferably below 1 mm, more preferably below 0.8 mm. Within the context of the present application, the planarity deviation is defined as the height difference between the extremal portion and the central portion of an edge of the board. In particular within the scope of the present invention the planarity deviation is measured by placing the extremes of one edge of the decorative layer, on a horizontal plane and measuring the distance between the middle of the edge from that horizontal plane. According to an embodiment of the invention, upon this compressive effect the planarity deviation of the floor element after gluing is at least 1%, preferably at least 5%, for example at least 10% higher than the planarity deviation of the decorative layer before gluing.

The inventors have also found that preferably the resin may be free from fillers, like mineral fillers. In fact, the inventors have found that the presence of fillers if on one hand improves mechanical properties of the resin as such, on the other hand increases the viscosity of the resin thereby forming an obstacle to the permeation of the decorative layer.

The resin preferably comprises a tensile strength between 50 and 90 MPa, more preferably between 60 and 80 MPa, for example 75 MPa. It is noted that the resin preferably comprises a compressive strength between 90 and 130 MPa, more preferably between 100 and 120 MPa, for example 110 MPa. The inventors have found that such strength is sufficient to provide a rigid matrix for the composite polymer-ceramic layer that allows dissipation of the impact energy. It is also noted that the resin may preferably show a hardness value of at least 50 measured on a Shore D scale.

Preferably the resin covers at least a portion of the lower surface of the decorative layer, for example the majority, i.e. at least 50 percent, of the lower surface of said decorative layer. More preferably the resin covers 80 percent or more of the lower surface of the decorative layer, for example it covers the 100 percent of the lower surface of the decorative layer so that the effect of distribution and dissipation of the impact energy is obtained for an impact occurring in any point of the decorative layer.

The resin is preferably provided onto the lower surface of the decorative layer in an amount above 150 g/sqm, more preferably above 200 g/sqm, for example 220 g/sqm so that the resin it's in an amount that is sufficient to fully permeate the open pores of the lower surface of the decorative layer.

It is also preferable that the resin is provided in an amount sufficient to overflow from the open porosity of the decorative layer in order to act as a glue for the board. In other words, it is preferable that the resin partially permeates the open porosity of the decorative layer and partially coats the lower surface thereof for forming the intermediate layer and improving the transfer of energy. Said effect of transfer of energy is further improved if the board is directly fixed to the intermediate layer and, in particular, to said portion of the resin that coats the lower surface of the decorative layer, so that the intermediate layer acts as an adhesive layer that bonds together the decorative layer and the board.

Further, the intermediate layer may comprise a reinforcing element. The reinforcing element may be embedded into the intermediate layer, for example embedded into the resin material or may be a reinforcing layer placed between the intermediate layer and the board. The reinforcing element may comprise fibers like glass fibers carbon fibers, polymeric fibers, for example aramid or polyamide fibers, or ceramic fibers, for example boron or silicate fibers. The fibers may be woven or non-woven fibers, for example with fibers disposed at different orientations, and may be in in form of mat, fleece or cloth. Said reinforcing element may be used to further improve the impact resistance of the floor elements especially in case of special and peculiar installation like raised floors.

According to an alternative embodiment the reinforcing element may comprise a metal plate, for example a steel or aluminum plate. Preferably, the metal plate is configured to establish a compressive state in the decorative layer. In this way, since the decorative layer is in a compressive state, the impact resistance is strongly improved, because the compression obstacles the propagation of cracks and helps in disguising the visual effect of superficial cracks. To achieve this goal, the metal plate is first stretched, for example by means of a mechanical or thermal stretching, and then is bonded to the decorative layer while the metal plate is in the stretched state. Subsequently, the stretch is released, by interrupting the mechanical solicitation or by cooling the metal plate itself, thereby establishing a compressive state in the decorative layer. For example, embodiment, the metal plate has a coefficient of thermal expansion higher than the coefficient of thermal expansion of the decorative layer. Thanks to this solution, the reinforcing element is heated to a stretched state, and then it is bonded to the decorative layer while it is still in the stretched state and subsequently it is cooled down to retract and put the decorative layer in compression.

As already stated above, it is preferred that in a coupled condition, the decorative surface of two adjacent floor elements are separated by an intermediate distance. The intermediate distance, or gap, between the decorative layers of adjacent floor elements can be further finished in several possible ways.

According to a first possibility, said intermediate distance between the decorative layer can be filled by a grout thereby providing an impermeable floor covering. The grout may be a flexible or rigid grout. The grout may be polymer-based, cement-based or be based on a mixture of polymer and cement. Examples of polymer-based grout are epoxy based, acrylic based, urethane based or silicone base.

In a second possibility, the decorative layer can be at least partially, preferably completely, surrounded by a gasket so that in a coupled condition of two adjacent floor elements said gasket is compressed by the decorative layer of an adjacent floor element so to form a substantially water tight connection between the floor elements.

It is noted that the characteristic that the floor element comprises an intermediate layer having a resin material that permeates a lower surface of the decorative layer, forms an inventive idea irrespective of the presence of a board, and in particular of a board comprising edges with coupling elements configured to realize a mechanical coupling with coupling elements of an adjacent floor element. Hence, the present invention, according to its second independent aspect, relates to a floor element for forming a floor covering, wherein this floor element comprises a first decorative layer made of a ceramic material and a second layer arranged below this decorative layer, wherein the second comprises a resin material that permeates a lower surface of the decorative layer.

The inventors have found that traditional floorings, for example floorings made of porcelain floor elements with a thickness of approximately 10 mm, directly glued to a subfloor, usually show impact strength comprised between 1.68 J and 2.25 J (corresponding to a ball falling from a height comprised between 762 and 1016 mm) whereas known floating floors show an impact strength usually lower than 1.12 j (corresponding to a ball falling from a height lower than 508 mm). The inventors have found that, thanks to second layer of the second aspect, an impact strength above 5.62 J (corresponding to a fall of the steel ball from a height of above 2540 mm) can be achieved.

Fatigue strength for flooring is determined by means of the so-called Robinson Test according to ASTM C627. According to this test a three-wheel cart rotates about its center on top of a sample section of a tiles floor. Above each wheel is a rod along which weights can be stacked. A power motor drives the assembly and the cart rotates at a rate of 15 revolutions per minute. The test is run according to a loading schedule with 14 different cycles. For each cycle, the schedule specifies a type of wheel to be used (soft rubber, hard rubber, or steel), the amount of weight to be stacked above each wheel, and the total number of cart revolutions to be executed. After the completion of each cycle, the sample floor section is visually examined. The test result qualifies the floor according to the number of cycles passed without failure and indicates the following service level to which the floor is destined:

Sample completing cycles 1 through 3 without failure: "Residential" rating;
Samples completing cycles 1 through 6: "Light" commercial rating;
Samples completing cycles 1 through 10: "Moderate" commercial rating;
Samples completing cycles 1 through 12: "Heavy" commercial rating;
Samples completing all 14 cycles without failure are assigned in "Extra heavy" commercial rating.

The inventors have found that due to the use of the second layer according to the second aspect of the invention, the Robinson Test can result in passing 6 cycles (Light Commercial) as minimum.

According to this second independent aspect of the invention the floor element may optionally comprise a third board placed below the second layer. Moreover, optionally said third board may comprise one or more of the features of the board described above in relation to the first independent aspect. The decorative layer and the intermediate layer may comprise one or more of the features described above in relation to the first independent aspect.

As an example, a floor element according to said second independent aspect may be installed on a subfloor by means of a pressure sensitive adhesive layer, a tack fast loop fabric layer, (for example Velcro®). For example, the floor element may comprise a pressure sensitive adhesive layer placed below the second layer, for example a bi-adhesive layer covered by a covering sheet to be peeled out before installing the floor element onto the subfloor. Alternatively, the floor element may also be installed on a pressure sensitive adhesive underlayment. As a further example a floor element according to said second independent aspect may be installed on a subfloor by means of a tack fast loop fabric layer (for example Velcro®). In this case the floor element may comprise a third board comprising a loop and hook fabric adapted to interlock with an underlayment of the subfloor. Moreover, for example, the floor element according to said second independent aspect may be installed on a subfloor by means of magnetic means. In this case the floor element may comprise a third board comprising a magnetic and/or ferromagnetic material suitable to interact with a magnetic and/or ferromagnetic underlayment of the subfloor.

It is also to be noted that the fact that after curing of the resin the tile is compressed and therefore reinforced, forms an inventive idea irrespective form the presence of a board and from the fact that the resin permeates the lower surface of the decorative layer. Thereto, the present invention, according to its third independent aspect, relates to a floor element for forming a floor covering, wherein this floor element comprises a decorative layer made of a ceramic material and a board arranged below this decorative layer, wherein the floor element comprises a layer having a resin material disposed below the decorative layer, and wherein said resin compresses the decorative layer. In fact, the inventors have surprisingly found that the if the resin during its curing compresses the decorative layer, the impact strength of the whole floor element is increased.

It is noted that the floor element according to the third aspect may comprise one or more of the features described in relation to the first and or the second aspect. In fact, although not necessary, the presence of a board and/or the fact that the resin permeates the lower surface of the decorative layer are preferable features of the third layer.

It is to be noted that the fact that the resin material may be used for forming a floor covering comprising a decorative layer, for example made of a ceramic material, and wherein the resin permeates a lower surface of the decorative layer and/or compresses the decorative layer, forms an inventive idea irrespective of the further characteristic of the floor element like, by way of example, the nature of the decorative layer and the presence of the board. Hence, for example, according to a fourth independent aspect, the invention relates to a use of a resin material for bonding together a decorative layer made of a ceramic material and a board to form a floor element. Wherein the resin material may comprise one or more of the features of the board described above in relation to the first independent aspect. Also, the decorative layer and the board may comprise one or more of the features described above in relation to the first independent aspect.

According to a fifth independent aspect of the invention, it is provided a floor covering comprising a plurality of adjacent floor elements, wherein one or more of the floor elements are made according to the first, second or third aspect and wherein the floor covering comprises a grout filling an intermediate distance separating the decorative layers of the floor elements. Preferably the floor elements are separated from a subsurface, for example the subfloor, i.e. they are not bonded to the subsurface by means of adhesive or mechanical means. Thus there is provided a floor covering composed of floor elements installed without using of adhesive, that shows a high satisfying impact and fatigue strength, and is totally impermeable. By means of the fifth aspect, the inventors have finally offered a solution to a long-felt need in the ceramic flooring world. They have provided an easy to be installed ceramic tile flooring, with a good impact strength and waterproofness.

According to a preferred embodiment of the invention the floor covering comprises an under-layer disposed beneath the floor elements that is configured to act as a moisture barrier. Thus it is possible to prevent the forming of mold underneath the floor elements. In combination or as an alternative to this solution, the under-layer can be configured to act as a noise barrier thereby reducing the noise generated by steps on the floor.

The invention further relates to a method for manufacturing a floor element, for example the floor element according to the first second and/or third aspect of the invention. Therefore, according to a sixth independent aspect of the invention it is provided a method for manufacturing a floor element comprising the steps of: providing a decorative layer made of a ceramic material; providing a board; providing a resin material for bonding the decorative layer and the board together; pressing the layers together for forming the floor element such that the resin material permeates the ceramic layer. In this way it is provided a method that allows manufacturing of floor elements to be installed on a subfloor without glue or adhesive and that shows relevant impact and fatigue resistance. Moreover, said method allows the manufacturing of high resistance floor elements in a simple and effective way. In fact, since it is not necessary the use of rigid reinforcing element, the method comprise a reduced number of steps so that it is relatively quick, and it can be carried out by means of a relatively simple equipment. The obtained floor element preferably shows the characteristic of the previously described floor elements of the invention in any of its aspects.

The step of providing the decorative layer may comprise a step of brushing and/or roughing the lower surface of the decorative. Said step of brushing and/or roughing has the goal of prepare the lower surface of the decorative layer to be permeated by the resin material. For example, in case the decorative layer is made of a ceramic material, said step of brushing and/or roughing aims to remove the backwash and/or the structure of the lower surface of the decorative layer. In this way, any decorative layer may be used for manufacturing the floor element without being necessary to manufacture a specific decorative layer for the floor element, for example without being necessary to manufacture a ceramic tile without the backwash and without the structure on the lower surface.

According to an embodiment of the invention, the method may further comprise a step of annealing the board. Said step is particularly effective in case the board comprises a polymeric material, more preferably a thermoplastic material, for example PVC. The annealing step remove internal stresses in the material of the board thereby reducing planarity deviation of the board itself. During the annealing step the board is heated up to an annealing procedure which is preferably below the glass transition temperature of the material of the board. The annealing step can be performed at any moment prior to the step of providing the resin. It is also possible that the method comprises the step of providing an already annealed board.

As already described, the board may comprise edges provided with coupling elements. Therefore, according to the preferred embodiment of the invention, the step of providing the board may comprise the step of providing a board comprising edges provided with coupling elements, i.e. the coupling elements are provided in the board during a separate process. Alternatively, the method for manufacturing the floor element may comprise a step of providing the coupling elements in the edges of the board. Said step of providing the coupling elements may comprising milling, molding or other techniques. Moreover, said step of providing the coupling elements may be conducted either before or after a step of placing the decorative layer above the board, for example either before said step of providing the resin or after said step of pressing.

According to a preferred embodiment, the method may comprise a step of treating the upper surface of the board. Said step of treating the upper surface of the board may comprise sanding, brushing, grinding or any other technique suitable to roughing the upper surface of the board. This would improve the bonding between the resin and the upper surface of the board and would also provide friction between the decorative layer and the board so in order to prevent sliding of the decorative layer upon the board that can otherwise occur when the resin is not yet cured. The method may comprise the step of providing a board having a roughed surface.

The step of providing the resin comprises the step of applying a non-cured resin on at least a surface of the decorative layer and/or of the board. The resin material may be provided by means of rolling, ejection from a nozzle (for example spraying), curtain or other techniques. According to an embodiment of the invention the resin material is applied onto the upper surface of the board. According to an alternative embodiment the resin material is applied during multiple intermediate steps, for example a first amount of resin is applied onto the upper surface of the board in a first intermediate step and a second amount of resin is applied onto the lower surface of the decorative layer in a second intermediate step. This solution is preferred especially for manufacturing floor elements wherein the intermediate layer comprises a reinforcing element, for example a fiber. In fact, in this case a higher amount of resin may be necessary and multiple steps for providing the resin may be ideal to ensure the correct gluing between the layers, embedding of the reinforcing element and permeation of the decorative layer.

The step of providing the resin can comprise the step of mixing the components thereof, in case the resin is a bicomponent resin, for example a bicomponent epoxy. Said step of mixing may be executed during, i.e. contemporarily, or shortly before the step of applying the uncured resin. In fact, often the curing of the resin is activated by the mixing of its components and as a consequence the viscosity of the resin increases. Thus, it is preferable to delay as much as possible the start of the curing reaction in order to make easier to spread the resin onto the layers' surfaces and improve the permeation of the decorative layer. For example, according to a preferred embodiment of the invention, the resin is applied by means of ejection from a nozzle, for example spraying, and the components are mixed during spraying, for example substantially in correspondence of a nozzle of the equipment.

Preferably, during the pressing step it is exerted onto the layers a pressure of at least 350 kg/sqm, more preferably at least 370 kg/sqm. Said values have been found optimal to make the resin permeating the decorative layer. Moreover, these values have been found optimal for allowing the resin to reach a 100% coverage of the lower surface of the decorative layer, because in certain embodiment the resin is applied according to a pattern and then spread during said pressing step. Moreover, the inventors have found that by keeping the pressure for a prolonged pressing time it is possible to improve the permeation of the decorative layer, for example it is possible to obtain a higher penetration depth. Therefore, according to a preferred aspect of the invention the during the pressing step, the pressure is kept for a pressing time of more than 1 second, preferably more than 10 seconds, for example 30 seconds. This pressing time have been found optimal for allowing the resin to reach a 100% coverage of the lower surface of the decorative layer in case the resin is applied according to a pattern. Moreover, especially in case of resin made of epoxy, said pressing time is sufficient for making the resin to start curing so that the decorative layer and the board at least partially adhere each other and sliding between them during transportation of the floor elements after pressing are prevented.

The step of pressing may be conducted in any suitable way for applying a pressure to the decorative layer and/or the board in order to help the resin penetrating the decorative layer. Therefore, according to an embodiment of the invention the step of pressing may be a static pressing step wherein the layers enters into a mold of a static press so that is subjected to a predetermined pressure by means of a punch of the press. In this way it is possible to keep the pressure for the predetermined pressing time to improve the permeation of the decorative layer. According to an alternative embodiment the step of pressing may be a lamination step wherein the layers runs into a laminating equipment, for example under one laminating roller or belt, or between a couple of laminating rollers, so that is subjected to a predetermined pressure. Since lamination is a continuous process it is possible to speed up the global manufacturing method while at the same time exerting a sufficient pressure onto the layers for the permeation of the decorative layer. During lamination the pressing time is function of the advancing speed of the layers, therefore the advancing speed may be regulated in order to speed up the process while at the same time a sufficient pressing time is guaranteed.

Preferably, the method comprises a step of stocking the floor elements for a stocking time in order to allow the resin to at least partially cure before being, packaged, transported and/or used in a floor covering. Preferably the stocking time is such to allow the resin to be at least 70% cured, preferably 85% cured, more preferably fully cured. For example, said stocking time is at least 0.5 h, preferably more than 1 h, for example 2 h.

According to an embodiment of the invention during the step of stocking the floor elements, the floor elements are stacked one above the other. This is to prevent delamination between the decorative layer and the board when the resin is not yet sufficiently cured. In fact, in this way the decorative layer and the board of one floor element are kept in contact by the weight of the floor elements disposed above. This is especially the case when the decorative layer comprises a significant planarity deviation, especially when measured on the back side. Another, possibility for preventing delamination could be a step of applying a fast curing resin before the step of pressing. This fast curing resin can be for example acrylic resin or cyanoacrylates or hot melt resin. Said fast curing resin can constitute the resin of the intermediate layer or be applied in addition to the resin of the intermediate layer, for example in a smaller amount. For example, said fast curing resin can be provided according to a pattern or in dots, for example at least one dot in a central or a peripheral portion of the decorative layer, preferably in form of dots in at least two opposites corners of the decorative layer. In this way the fast curing resin immediately cures and stick together the decorative layer and the board thereby preventing delamination. The fast curing resin may further prevent sliding of the decorative layer above the board that could otherwise occur after pressing during moving of the floor elements, for example exiting of the press, if the resin of the reinforcing layer is not yet cured.

According to an embodiment of the invention, the method comprises a step of compressing the decorative layer. Said step of compressing, preferably substantially coincide with the curing of the resin. For example, the compressing step may coincide with the stocking step.

In fact, the inventors have found that with resins showing the features described with reference to the first aspect of the invention, since during curing the resin is the only component of the floor element that shrinks, it compresses the decorative layer disposed above thereby reinforcing the decorative layer itself. This effect can be further enhanced if the resin permeates the lower surface of the decorative layer. In fact, if the resin of the intermediate layer permeates the lower surface of the decorative layer the strong bonding within the two layers helps the compressive action of the resin. Moreover, this reinforcing mechanism due to the compressive action of the resin may join the reinforcing action due to the filling of the pores and the improved stress transfer mechanism toward, if present, the board.

This compressive effect is evident by measuring the bowing of the floor element, i.e. the planarity deviation thereof. Usually, the planarity deviation of the decorative layer is reflected into the bowing of the whole floor element and, as already introduced, it may complicate the coupling of the floor element. The inventors have found that after curing of the resin the floor element shows a planarity deviation which is higher than the planarity deviation of the sole decorative layer before application of the resin. This means that the decorative layer is compressed and reinforced. According to an embodiment of the invention, upon this compressive effect the planarity deviation of the floor element after gluing is at least 1%, preferably at least 5%, for example at least 10% higher than the planarity deviation of the decorative layer before gluing.

In a seventh independent aspect of the invention there is provided a method for manufacturing a floor element comprising the steps of: providing a decorative layer made of a ceramic material; providing a board; providing a resin material for bonding the decorative layer and the board together; cure the resin; promote the shrinkage of the resin. It is noted that the method may comprise one or more of the features described in relation to the sixth aspect, as well as the decorative layer, the resin and the board show one or more of the features described in the aspects from the first to the fifth.

It is to be noted that in order to simplify installation of the floor covering comprising the floor elements according to the anyone from the first to the third aspects, one or more tools may be used.

In an eighth independent aspect there is provided a first tool suitable for installing a floor covering having floor elements, wherein the floor elements comprise a decorative layer and a board disposed below the decorative layer and wherein the board having edges provided with coupling elements adapted to cooperate with coupling elements of an adjacent similar floor element in said floor covering, wherein the first tool comprises a body having first beating surface adapted to contact a surface of the decorative layer, and at least a second beating surface adapted to be hammered. In this way, in case it is needed to force the coupling between the floor elements, it is possible to use a hammer and exert the necessary force without breaking the decorative layer because said force is dampened and transferred to the decorative layer by the first beating surface.

In one embodiment the first beating surface is adapted to contact the surface of an edge of the decorative layer, for example the first beating surface is adapted to be placed vertical in use, and, preferably, said first beating surface has a vertical dimension (in use) substantially equal or lower than the thickness of the decorative layer, for example said vertical dimension is lower than 15 mm, preferably lower than 10 mm, for example about 8 mm. In this way the first beating surface can transfer to the decorative layer horizontal forces exerted to move horizontally the floor element and effecting the coupling via a translational horizontal movement. By way of example, this operation is performed to couple the transversal edges of two floor elements on a same row that is parallel to the longitudinal edges of the floor elements, once one longitudinal edge of the floor elements to be moved is already coupled with a third-floor element on a parallel row.

In one embodiment the first beating surface is adapted to contact the top surface of the decorative layer, for example the first beating surface is adapted to be placed vertical in use. In this way the first beating surface can transfer to the decorative layer vertical forces exerted to move horizontally the floor element and effecting the coupling via a translational vertical movement. This is particularly the case when the coupling elements are adapted to be coupled via a translational vertical movement.

In one embodiment, the first tool may comprise a plurality of said first beating surfaces. For example, the first tool may comprise a plurality of said first beating surfaces adapted to contact the surface of an edge of the decorative layer, for example a couple of said first beating surfaces adapted to contact the surface of an edge of the decorative layer wherein said two first beating surfaces are orthogonal each other so that the first tool may be disposed contact and angle portion of the decorative layer. In this way, while hammering to push the floor element along a direction which is perpendicular to an active first beating surface, the orthogonal second first beating surface is substantially inactive but helps keeping aligned the floor element to be moved. Alternatively, the first tool may comprise one or more of said first beating surfaces adapted to contact the surface of an edge of the decorative layer, and one first beating surface is adapted to contact the top surface of the decorative layer.

In one embodiment, the first beating surface may comprise a dampening element adapted to dampen the force exerted by the hammer to reduce the risk of breaking the decorative layer. For example, the dampening element can comprise a soft coating of the first beating surface. For example, said soft coating may be made of rubber or a textile like felt. This solution is particularly effective in case the decorative layer comprises a ceramic tile, and in particular in case the ceramic tile is glazed. In fact, the glaze, being a glassy material, is particularly fragile and can break or crack because of the force exerted by the hammer.

The second beating surface is preferably, although not necessarily, parallel to the first beating surface. Moreover, the first tool comprises at least one second beating surface for each first beating surface. In a preferred embodiment, the second beating surface is provided on the same body portion of the first tool and is opposite to the first beating surface. Within the scope of the present application "opposite on the same body portion" means that exist one straight line that is orthogonal to both the first beating surface and the correspondent second beating surface. According to an alternative embodiment, the second beating surface may be provided on a different body portion of the correspondent first beating surface, for example they may be not opposite each other. Within the scope of the present application "not being opposite on different body portion" means that it doesn't exist one straight line that is orthogonal to both the first beating surface and the correspondent second beating surface. This solution is particularly effective when it is needed to hammer a floor element in a position of the room where the operation is difficult for the limited space, for example close to a wall.

The first tool may further comprise a handle portion to simplify its handling.

In a preferred embodiment, the first tool is made of at least a polymeric material, preferably a thermoplastic material, for example polycarbonate (PC), poly methyl methacrylate (PMMA acrylic), polyethylene (PVC), polypropylene (PP), PVC, PET, ABS, PA.

According to a ninth independent aspect there is provided a second tool suitable for installing a floor covering having floor elements, wherein the floor elements comprise a board having edges provided with coupling elements adapted to cooperate with coupling elements of an adjacent similar floor element in said floor covering, wherein the second tool comprises an handle portion and a plane portion provided with at least one edge and wherein said edge is provided with a coupling element to be coupled with at least one coupling element of the board. This tool is particularly useful to couple the transversal edges of two floor elements on a same row that is parallel to the longitudinal edges of the floor elements. In this case the second tool may be coupled to the longitudinal edges, via its coupling element, of both the floor elements so that during the translational horizontal movement to couple the transversal edges it guides said translational movement along the horizontal direction.

Preferably the plane portion of the second tool comprises coupling elements on each of its opposite edges. For example, a male coupling element along a first edge and a female coupling element along a second coupling edge.

In a preferred embodiment, the second tool, and in particular at least the handle thereof, is made of at least a polymeric material, preferably a thermoplastic material, for example polycarbonate (PC), poly methyl methacrylate (PMMA acrylic), polyethylene (PVC), polypropylene (PP), PVC, PET, ABS, PA.

According to an embodiment of the invention the plane portion can be made of the same material of the board and can be attached to the handle.

It is to be noted that the invention also relates, according to a tenth independent aspect, to a kit comprising one or more first tool and one or more second tool. Wherein the first tool and the second tool comprise one or more of the features described with reference to the eight and the ninth independent aspect respectively.

It is also to be noted that floor element mentioned within said eight, ninth and tenth independent aspect may comprise may have one or more of the features described in the first, second and third independent aspect.

Figure 2:
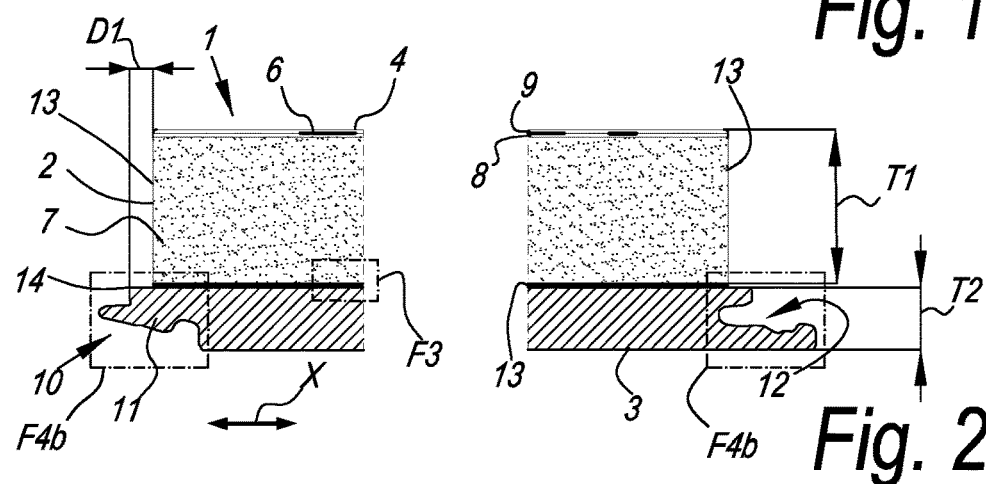
FIG. 2 on a larger scale shows a cross section along the line II-II of FIG. 1.
Figure 3:
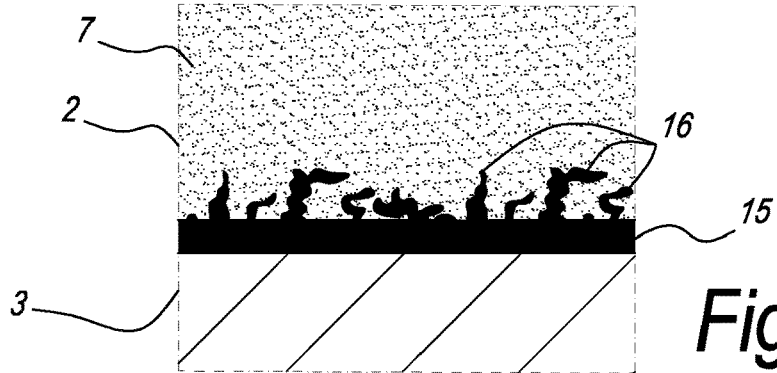
FIG. 3 on a larger scale shows a view on the area F3 indicated on FIG. 2.
Figures 4A, 4B:
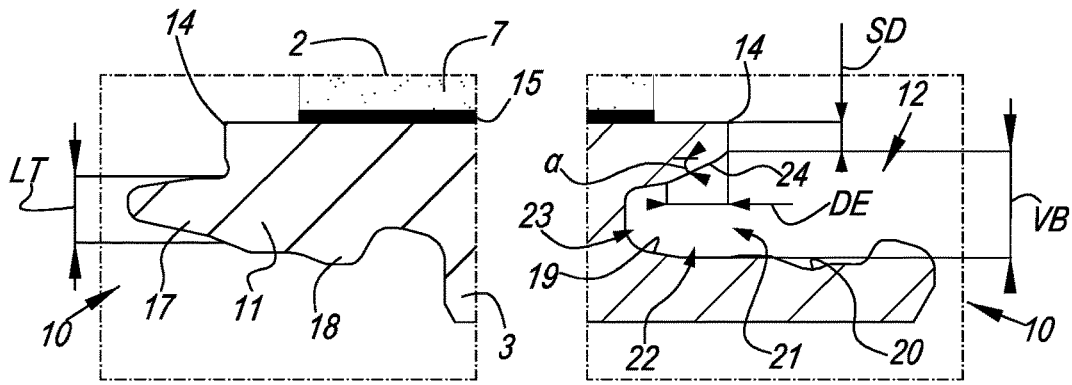
FIGS. 4a and 4b on a larger scale respectively show a view of the areas F4a and Fb indicated on FIG. 2.
Figure 5:
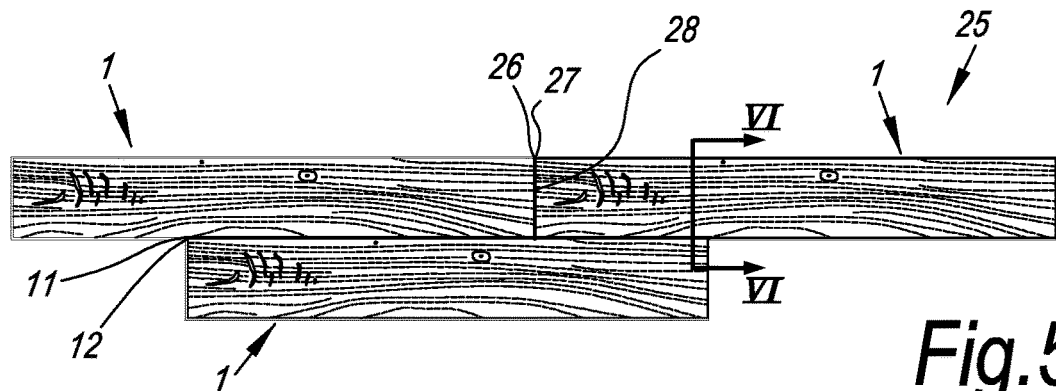
FIG. 5 on a smaller scale shows a top plane view of a floor covering comprising a plurality of the floor elements of FIG. 1.
Figure 6:
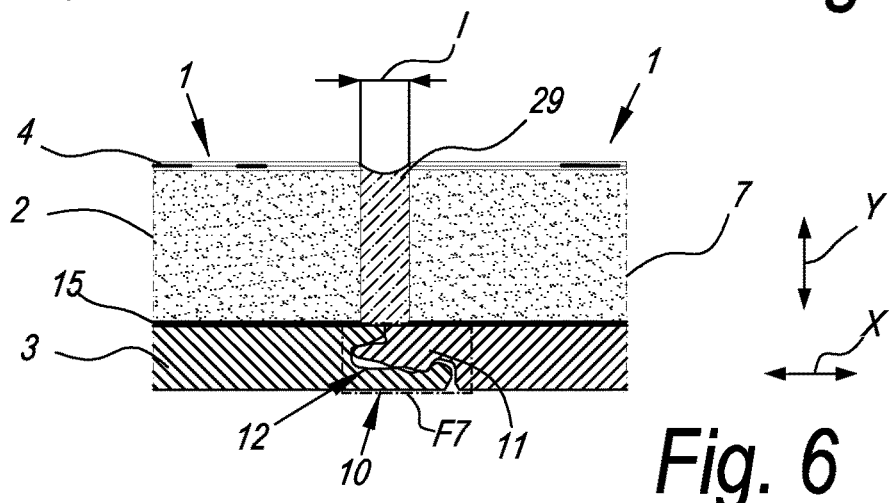
FIG. 6 on a larger scale shows a cross section along the line VI-VI of FIG. 5.
Figure 7:
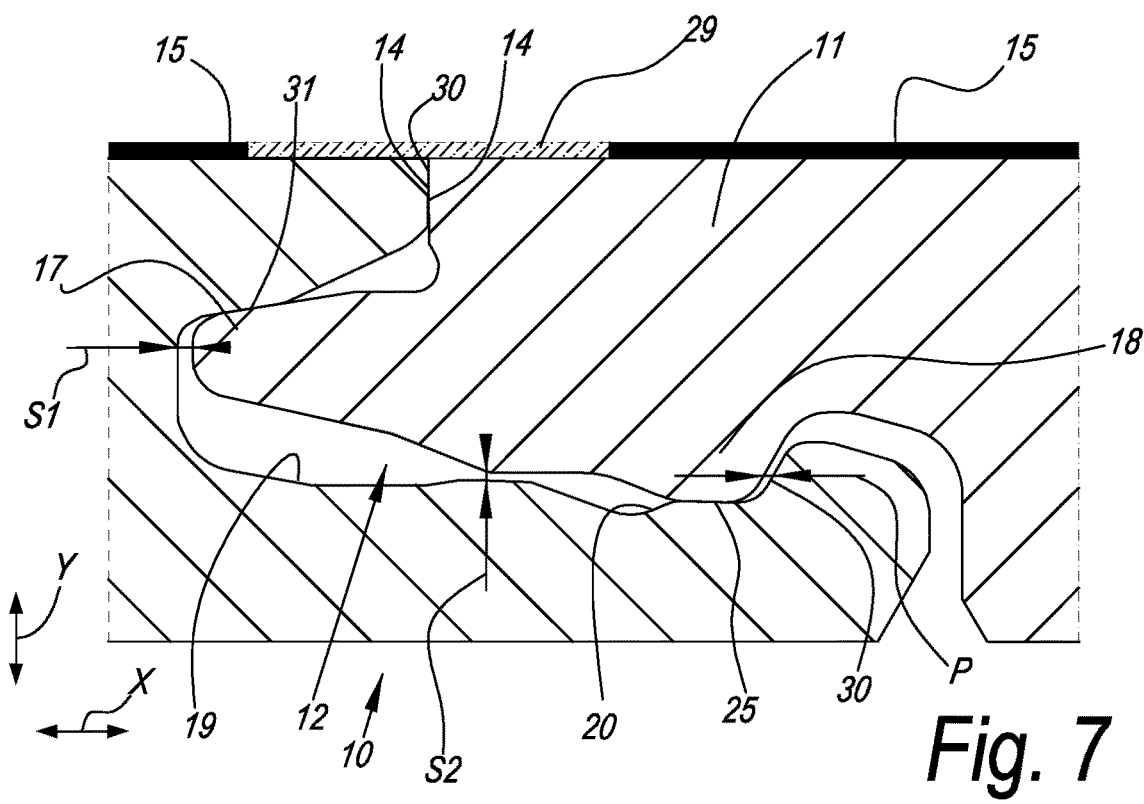
FIG. 7 on a larger scale shows a view on the area F7 indicated on FIG. 6.

With the intention of better showing the characteristics of the invention, in the following, as an example without any limitative character, several preferred forms of embodiments are described with reference to the accompanying drawings, wherein:

FIG. 1 shows a top view of a first embodiment of a floor element of the invention;

FIG. 2 on a larger scale shows a cross section along the line II-II of FIG. 1;

FIG. 3 on a larger scale shows a view on the area F3 indicated on FIG. 2;

FIGS. 4a and 4b on a larger scale respectively show a view of the areas F4a and Fb indicated on FIG. 2;

FIG. 5 on a smaller scale shows a top plane view of a floor covering comprising a plurality of the floor elements of FIG. 1;

FIG. 6 on a larger scale shows a cross section along the line VI-VI of FIG. 5;

FIG. 7 on a larger scale shows a view on the area F7 indicated on FIG. 6;

FIG. 8 show a schematic side view of a floor element of FIG. 1;

FIG. 9 on a smaller scale shows a top plane view of a floor covering comprising a plurality of the floor elements according to a second embodiment of the invention;

FIG. 10 on a larger scale shows a cross section along the line X-X of FIG. 9;

FIG. 11 on a larger scale shows a view on the area F11 indicated on FIG. 10;

FIG. 12 shows some steps of a method for manufacturing a floor element.

FIG. 13 shows a top plane view of a kit for installing the floor elements for forming the floor covering.

FIG. 14 on a larger scale shows a cross section of a first embodiment of a first tool of the kit along the line XIV-XIV of FIG. 13.

FIG. 15 on a larger scale shows a cross section of an alternative embodiment the first tool of the kit along the line XV-XV of FIG. 13.

FIG. 16 on a larger scale shows a cross section of the second tool along the line XVI-XVI of FIG. 13.

FIG. 1 shows a top view of a first embodiment of a floor element 1 according to the invention. The floor element 1 comprises a decorative layer 2 disposed above a board 3.

As illustrated, the floor element 1 comprises a rectangular elongated shape. Preferably, the floor element 1 comprises a superficial area of less than 1.5 sqm, preferably less than 1 sqm, more preferably less than 0.4 sqm. For example, the decorative layer 2 comprises edges having a maximum length L of less than 1.5 m, preferably less than 0.9 m.

The decorative layer 2 has an upper face 4 comprising a décor 5. The décor 5 can be provided with a variety of textures, designs and colors. In the illustrated example the décor 5 simulates a wood pattern comprising wood nerves and flakes. Preferably, the décor 5 is at least partially formed by a print 6. The print 6 is preferably realized by means of digital printing, such as inkjet printing, although screen printing, rotogravure, flexography or off-set printing is not excluded.

FIG. 2 on a larger scale shows a cross section along the line II-II of FIG. 1. According to the illustrated example the decorative layer 2 comprises a body 7 made of a ceramic material, for example red body ceramic or porcelain.

The decorative layer 2 comprises a background coating 8 covering at least partially the upper surface of the body 7, for example comprising at least a glaze. The background coating 8 is adapted to receive the décor 5 on its top, for example adapted to receive the print 6 on its top. The background coating 8 can be white, beige, brown or of any color suitable to receive the décor 5 on its top.

The decorative layer 2 further comprises a protective coating 9 covering at least partially the upper surface of the body 7, for example comprising at least a glaze. The protective coating 9 is adapted to be placed above the décor 5 and is transparent or translucent.

FIG. 2 also shows that decorative layer 2 has a thickness T1 comprised between 4 and 15 mm, for example 6 mm, preferably above 7 mm, for example 8 or 10 mm.

The board 3, according to the example, is made of a polymeric material, preferably a thermoplastic material like PVC. In a preferred embodiment, the board is made of a rigid PVC. Within the context of the present description, "rigid" means that the board, taken alone, bends under the own weight thereof less than 10 cm per meter and still better less than 5 cm per meter. The board 3 may also comprise a high amount of filler materials, such as chalk, e.g. more than 30 wt % or more than 60% wt of such filler materials.

Moreover, according to the preferred embodiment, the board 3 is made of a rigid PVC that may comprise a flexural modulus between 1.5 and 3.5 GPa, for example, approximately 2.6 GPa. The board 3 may also comprise a flexural strength between 60 and 90 MPa, for example approximately 76 MPa. Moreover, the board 3 may comprise a compressive strength between 40 and 70 MPa, for example approximately 56 MPa.

Furthermore, the board 3 preferably has a thickness T2 comprised between 2 and 7 mm, preferably below 6 mm, for example about 4 mm.

FIG. 2 also shows that the board 3 comprises longitudinal edges 10 provided with first coupling elements 11,12 configured to realize a mechanical coupling with coupling elements 11,12 of an adjacent floor element 1. In the illustrated examples the coupling elements 11,12 comprise a male and female parts disposed on opposite longitudinal edges 10.

The first coupling elements 11,12 of the longitudinal edges 10 are configured for being coupled each other by means of an angling motion around a horizontal axis parallel to the longitudinal edges 10. The male and female parts are respectively shaped in form of a tongue 11 and a groove 12 wherein the tongue 11 projects outwardly beyond its respective longitudinal edge 10 in a horizontal direction X and the groove 12 projects inwardly with respect to the respective longitudinal edge 10 in said horizontal direction.

The board 3 extends beyond longitudinal edges 13 of the decorative layer 2. In the example, the board 3 comprises upper longitudinal edges 14 that extend beyond the longitudinal edge 13 of the decorative layer 2 of a distance DI. Said distance DI is equal on both the opposite longitudinal edges 13 of the decorative layer 2.

FIG. 2 further shows that the floor element 1 comprises an intermediate layer 15 disposed between the decorative layer 2 and the board 3. The intermediate layer 15 comprises a resin material, for example a thermosetting resin or thermoplastic resin. Examples of thermosetting resin are epoxy, polyurethane, cyanoacrylate, unsaturated polyester, vinyl ester or acrylic resin. Examples of thermoplastic resin are hot melt, polyester thermoplastic, vinyl etc. Preferably the resin is a rigid resin. In particular, according to the preferred embodiment of the invention the intermediate layer 15 comprises an epoxy resin. It is also preferred that the epoxy is a bicomponent resin, i.e. a thermosetting resin obtained by curing at low temperature (for example at room temperature) a mixture of two components, namely a resin and a hardener.

The resin preferably comprises a tensile strength between 50 and 90 MPa, more preferably between 60 and 80 MPa, for example 75 MPa. Moreover, the resin preferably comprises a compressive strength between 90 and 130 MPa, more preferably between 100 and 120 MPa, for example 110 MPa. It is also preferable that the resin shows a hardness value of at least 50 measured on a Shore D scale.

As illustrated the intermediate layer 15 covers the 100 percent of the lower surface of the decorative layer 2. The resin is preferably provided onto the lower surface of the decorative layer 2 in an amount above 150 g/sqm, more preferably above 200 g/sqm, for example 220 g/sqm.

In the preferred example illustrated in FIG. 2, the intermediate layer 15 is in direct contact with the upper surface of the board 3 so that act as a glue between the decorative layer 2 and the board 3.

FIG. 3 on a larger scale shows a view on the area F3 indicated on FIG. 2. As illustrated in FIG. 3 the decorative layer 2, more in detail the body 7 thereof, comprises, at least in correspondence of its lower surface, an open porosity 16 adapted to be permeated by the resin of the intermediate layer 15.

Thus, according to a preferred embodiment of the invention, the decorative layer 2 comprises an apparent porosity between 0.1% and 10% determined according to ASTM C373, more preferably between 2% and 8%, for example 6%. Furthermore, the decorative layer 2 may preferably have a volume of the open pores 16 comprised between 0.01 cc (cubic centimeter) and 1 cc, more preferably between 0.10 cc and 0.90 cc, for example 0.60 cc.

Therefore, in order to properly flow into said open pores 16 the resin of the intermediate layer 15 comprises a viscosity at 20° C. below 1000 Pas, preferably below 800 Pas, more preferably below 600 Pas, for example approximately 400 Pas. Within the scope of the invention "viscosity" means the viscosity of the uncured resin, for example the viscosity of the mixture of the two components before the completion of the curing, i.e. during the so-called pot life.

FIG. 4a and Bb show on a larger scale a view on the areas F4a and F4b indicated on FIG. 2.

FIG. 4a shows in more detail the tongue 11 which comprises a horizontally extending lip 17 and a downward projecting hump 18. The horizontally extending lip 17 extends beyond the upper edge 14 of the longitudinal edge 10. Moreover, the horizontally extending lip 17 has a section tapered toward its tip. According to the preferred embodiment the horizontally extending lip 17 has a maximum thickness LT comprised between 0.20 and 0.4 times the thickness T2 of the board 3, preferably is 0.33 times the thickness T2 of the board 3. In other words, the ratio between the maximum thickness LT of the horizontally extending lip 17 and the thickness T2 of the board 3 is comprised between 0.25 and 0.4 and preferably is about 0.33. Within the scope of the present application the maximum thickness LT is the maximum thickness of the portion of the lip 17 that extends beyond the upper edge 14, for example it is measured substantially in correspondence of a vertical plane, parallel to the longitudinal edge 10, on which lies the upper edge 14. According to the preferred embodiment the maximum thickness LT of the lip 17 is comprised between 1 and 1.6 mm, preferably 1.3 mm.

FIG. 4b shows in more detail the groove 12 which has a horizontal recess 19, for receiving the lip 17 of the tongue 11, and an upward oriented hollow portion 20, for receiving the hump 18 of the tongue 11, so that tongue 11 can be fitted into the groove 12.

The horizontal recess 19 comprises an inlet opening 21 having a vertical breadth VB which is at least 0.4 times the thickness T2 of the board 3, preferably more than 0.45 times, more preferably more than 0.5 times, even more preferably about 0.53 times. In other words, the ratio between the vertical breadth VB and the thickness T2 of the board is more than 0.4, preferably more than 0.45, more preferably more than 0.5, even more preferably about 0.53. Preferably, the ratio between the vertical breadth VB and the thickness of the board is comprised between 0.4 and 0.7, preferably between 0.5 and 0.6.

It is to be noted that the vertical breadth VB of said inlet opening 21 is preferably measured substantially on the vertical plane on which lies the upper edge 14 of the longitudinal edge 10. It is also to be noted that preferably the vertical breadth VB of the inlet opening 21 may correspond to the maximum breadth of the recess 19 of the groove 12. According to the preferred embodiment of the invention, the vertical breadth VB is above 1.6 mm, preferably above 1.8 mm, more preferably above 2 mm.

Moreover, between the upper border of the inlet opening 21 of the recess 19 and the upper edge 24 of the longitudinal edge 10 is provided a separating distance SD. The ratio between said separating distance SD and the thickness T2 of the board 3 can be below 0.2, preferably below 0.15. For example, said ratio between separating distance SD and the thickness T2 of the board 3 can be comprised between 0.2 and 0.1. For example, said separating distance SD can be below 0.9 mm, preferably below 0.6 mm. For example, said separating distance can be comprised between 0.9 and 0.4 mm.

FIG. 4b also shows that the recess 19 may comprise a first portion 22 close to the inlet opening 21 and a second portion 23 close to the bottom of said recess 19. Preferably said first portion 22 comprises an inclined upper surface 24 descending toward the bottom of the recess, i.e. descending toward the second portion. Said inclined upper surface 24 is inclined with respect to the horizontal (preferably with respect to the upper surface of the board 3) of an angle α comprised between 30° and 50°, for example about 45°. The transition between the first and the second portion 22,23 substantially coincides with a change in the inclination of said inclined upper surface 24, in particular when said angle α diminishes. It is to be noted that said first portion 22 is larger than the second portion 23, wherein with larger it is meant with respect with the vertical dimension of the recess 19. Said first portion 23 may extends toward the bottom of the recess 19 for a deepness DE that is at least 0.3 times the whole maximum deepness of the recess 19, i.e. the sum of the deepness the first and the second portion 22,23. Preferably, the deepness DE of the first portion 22 is at least 0.4 times, more preferably at least 0.5 times (i.e. at least the half) of the whole maximum deepness of the recess 19. Said deepness shall be measured starting from the inlet opening 21, i.e. from substantially form a vertical plane parallel to the longitudinal edge 10 and on which lies the upper edge 14 of the longitudinal edge 10. Therefore, the deepness DE of the first portion 22 is measured starting from the inlet opening until the transition between the first and the second portion 22,23. Whereas the whole maximum deepness of the recess is measured starting from the inlet opening 21 until bottom of the recess 19. According to a preferred embodiment said deepness DE of the first portion 22 is more than 0.5 mm, preferably more than 0.75 mm, for example more than 1 mm. For example, said deepness DE of the first portion 22 is comprised between 0.5 and 1.5 mm, preferably between 0.75 and 1.25 mm.

FIG. 5 is a top plane view of a floor covering 25 comprising a plurality of floor elements 1 of FIG. 1 coupled by means of the first coupling elements 11,12 along the longitudinal edges 10 and by means of second coupling elements 26,27 along transversal edges 28 of the board 3. It is to be noted that in the preferred embodiment shown on FIGS. 1 and 5 the second coupling elements 26,27 are similar to the first coupling elements 11,12 described above. Within the scope of the present invention, with "similar" it is to be understood that the second coupling elements 26,27 are configured for being coupled each other by means of an angling motion around a horizontal axis parallel to the transversal edges 28. Moreover, with "similar" it is meant that the second coupling elements 26,27 are respectively shaped in form of a tongue 26 and a groove 27. It is also preferable, although not necessary, that the second coupling elements 26,27 comprise substantially the dimensions described for the firsts coupling elements 11,12. Therefore, they are neither shown nor described in further detail.

FIG. 6 on a larger scale shows a cross section along the line VI-VI of FIG. 5. The floor covering 25 comprises a grout 29 filling an intermediate distance I separating the decorative layers 2 of the floor elements 1. According to the illustrated example, the intermediate distance I is twice the distance DI between the upper edge 14 of the board 3 and the edge 13 of the decorative layer 2.

The grout 29 may be a flexible or rigid grout. The grout 29 may be polymer-based, cement-based or be based on a mixture of polymer and cement. Example of polymer-based grout are epoxy based, acrylic based, urethane based, silicone based. In the preferred embodiment the grout 19 is a flexible and acrylic based.

FIG. 6 further shows a section of the mechanical coupling between the firsts coupling elements 11,12 along a plane transversal to the longitudinal edges 10. Said mechanical coupling between the firsts coupling elements 11,12 is described in detail with the aid of FIG. 7.

In the coupled condition shown in FIG. 7 the upper edges 14 of the boards 3 contact each other thereby forming a first set of first locking surfaces 30 limiting the mutual movement of said floor elements 1 in a horizontal direction X perpendicular to the coupled longitudinal edges 10.

FIG. 7 also shows that in said coupled condition, the lip 17 is received by the recess 19. The upper surface of the lip 17 contacts un upper wall of the recess 19, in particular of the second portion 23 thereof, thereby forming a first set of second locking surfaces 31 that limit the mutual movement of said floor elements 1 in a substantially vertical direction Y. It is noted that between the tip of the lip 17 and the bottom of the recess 19 is established a horizontal inoperative space S1. Moreover, between lower surface of the lip 17 and the recess 19 is established a vertical inoperative space S2.

The downward projecting hump 18 of the tongue 11 is received by the hollow portion 20 of the groove 12. The lower surface of the downward projecting hump 18 contacts said hollow portion 20 so that a second set of second locking surfaces 31 is formed. In other words, the lower surface of the tongue 11 contacts the groove 12 exclusively in correspondence of the downward projecting hump 18.

In the coupled condition, of FIG. 7, between the projecting hump 18 and the hollow portion 20 is formed a horizontal play P that allows tiny horizontal movement of the tongue 11 into the groove 12. Said play P and said tiny horizontal movements are limited by a set of first contact surface that may be formed between the projecting hump 18 and the hollow portion 20.

Preferably, said play P is larger than 0.01 mm and lower than 0.15 mm, more preferably said play P is comprised between 0.03 and 0.1 mm.

It is noted that in the coupled condition the tongue 11 and the groove 12 are in an undeformed condition. Further, the whole angling movement that allows the coupling between the tongue 11 and the groove 12 occur without deformation of the first coupling elements 11,12. In fact thank to the play P and the inoperative spaces S1, S2 the coupling between the tongue 11 and the groove 12 is significantly simplified.

It is also evident that due to the wide vertical breadth VB the insertion of the lip 17 into the recess 19 is simplified even in case the lip 17 and the groove 20 are not perfectly aligned along the longitudinal edges 10, wherein with "aligned" it is meant that they are not on the same plane. This is, for example, the case shown in FIG. 8 wherein the floor element 1, and in particular the board 3 shows a planarity deviation PD above 0.1 mm, for example above 0.4 mm. It is anyway preferable that the planarity deviation PD is below 1.5 mm, more preferably below 1 mm, even more preferably below 0.8 mm. Within the scope of the present invention the planarity deviation PD is measured by placing the extremes of one edge 10, 28 of the floor element 1, for example of the board 3, on an horizontal plane HP and measuring the distance between the middle of the edge 10,28 from that horizontal plane HP. In case the floor element 1 is rectangular and oblong the planarity deviation PD is higher along the longitudinal edges 10. FIG. 8 shows a floor element 1 wherein the planarity deviation has been highly enhanced and is not in scale to help the description and explanation. Considering a floor covering 25 with an offset installation (FIG. 5) having the floor elements 1 showed in FIG. 8 it is evident that the longitudinal edges 10 of two adjacent floor elements 1 to be coupled each other don't lay on the same horizontal plane. Therefore, the recess 19 with a vertical breadth VB as described above improves the insertion of the lip 17 into the recess 19 even in case of relevant planarity deviation PD.

FIG. 9 is a top plane view of a floor covering 25 comprising a plurality of floor elements according to an alternative embodiment. This alternative embodiment differs from the first embodiment described above only in that it comprises second coupling elements 32,33 at the transversal edges 28 different from the first coupling element 11,12 at the longitudinal edges.

FIG. 10 on a larger scale shows a cross section along the line X-X of FIG. 9. FIG. 10 shows a section of the mechanical coupling between the second coupling elements 32,33 along a plane transversal to the transversal edges 28. Said mechanical coupling between the second coupling elements 32,33 is described in detail with the aid of FIG. 11.

In this second embodiment, the second coupling elements 32,33 of the transversal edges 28 are configured for being coupled each other by means of a translational movement along a substantially vertical direction. In the illustrated examples, said second coupling element 16, 17 are configured for being coupled by means of a translational motion in a downward, e.g. vertical, direction Y.

FIG. 11 on a larger scale shows a view on the area F11 indicated on FIG. 10.

The second coupling element elements 32,33 comprise downward-directed upper hook-shaped part 32 that is situated on one transversal edge 28 and an upward-directed lower hook-shaped part 33, which is situated on the opposite edge 28. The lower hook-shaped part 33 defines an upward directed cavity forming a female part, whereas the upper hook-shaped part 32 defines a downward-directed lip forming a male part.

Once in a coupled position the upper edges 14 of the transversal edges form the first locking surface 30 for limiting mutual movement of the floor elements 1 in a horizontal direction Z perpendicular to the transversal edge 28.

Moreover, both the upper hook-shaped part 32 and the lower hook shaped part 33 comprise undercut portions 34 so that in the coupled condition the second locking surfaces 31 are formed to limit the mutual movement of the floor elements 1 in the vertical direction Y. More particularly, two sets of said second locking surfaces 31 are formed, for example on opposite sides of upper hook-shaped part 32 and the lower hook shaped part 33.

Preferably, the lower hook shaped part 33 comprise a flexible lever portion 35 configured to be deformed by the coupling of the upper hook-shaped part 32 with the lower hook shaped part 33 so that by means of said deformation it is possible the coupling of the undercut portions 34.

It is to be noted that below the undercut portion 34 of the lower hook shaped part 33 are defined recess having a vertical inlet 21 opening that could comprise a vertical breadth VB having the dimension described above in relation to the first coupling element of the first embodiment. Anyway, in this second embodiment, the second coupling elements 32,33 doesn't show said dimensions since the planarity deviation on the transversal edge is generally neglectable with respect to the planarity deviation PD of the longitudinal edge 10.

FIG. 12 shows some steps of a method for manufacturing a floor element. The method comprises a first step S1 of providing the decorative layer 2. In the step S1 the decorative layer 2 is provided into a resin application station 40 wherein the uncured resin material R is provided, for example according to a pattern, onto a lower surface of the decorative layer 2. The uncured resin R preferably comprises a viscosity at 20° C. lower than 1000 Pas, preferably below 800 Pas, more preferably below 600 Pas, for example approximately 400 Pas. It is noted that in the resin application station 40 the decorative layer is placed with the upper surface, comprising the décor 6, facing down.

Then, in a step S2 the decorative layer 2 is carried into a placing station 41 wherein the board 3 is provided. The board 2 is placed below the lower surface decorative layer 3 thereby forming a semi-finished sandwich 42. Preferably, in said placing station 41 the decorative layer 2 and the board 2 are properly centered each other.

Successively, in a step S3 the semi-finished sandwich 42 is carried into a pressing station 43 wherein the layers 2,3 are pressed together for forming the floor element 1 such that the resin material permeates the pores of the ceramic material of the decorative layer 2 and forms the intermediate layer 15. Preferably, the pressure is kept for a pressing time of at least 1 second, preferably 30 seconds so that the uncured resin R can flow covering, at least the 80%, preferably the 100% of the lower surface of the decorative layer 2. Moreover, said pressing time is necessary to let the uncured resin R permeates the decorative layer 2. Preferably, during step S4 it is exerted onto the layers a pressure of at least 350 kg/sqm.

Then in a step S4 pressed floor element 1 is then carried into a stocking station 44 wherein for a predetermined stocking time in order to allow the resin R to continue curing before being, packaged, transported and/or used in a floor covering. Preferably the stocking time is such to allow the resin R to be at least 70% cured, preferably 85% cured, more preferably fully cured. For example, said stocking time is at least 0.5 h, preferably more than 1 h, for example 2 h.

According to a preferred embodiment of the invention, the method comprises a step of compressing the decorative layer 2. Said step of compressing preferably substantially coincide with the curing of the resin R and, in the example showed in the drawing, with the stocking step. In fact, the decorative layer 2 is preferably compressed by the shrinkage of the resin during curing in order to be reinforced against impacts. It is to be noted that upon this compression the floor element 1, after curing, shows a planarity deviation PD higher than the planarity deviation PD of the decorative layer 2 before application of the resin R.

FIG. 13 shows a top plane view of a kit for installing the floor elements 1 for forming the floor covering 25 wherein the kit comprises a first and a second first tool 50,51 and a second tool 52.

FIG. 14 on a larger scale shows a cross section of the first tool 50 along the plane XIV-XIV of FIG. 13. The First tool 50 comprises a body 53 having first beating surface 54 adapted to contact a surface of the decorative layer 2, and a second beating surface 55 adapted to be hammered.

In FIG. 14 is shown a first tool 50 according to a preferred embodiment wherein the first beating surface 54 is adapted to contact the surface of the 13 edge of the decorative layer 2 of the floor element 2. In the example, the first beating surface 54 is adapted to be placed vertical in use, and, preferably, said first beating surface has a vertical dimension TT (in use) substantially equal or lower than the thickness of the decorative layer, for example said vertical dimension TT is lower than 15 mm, preferably lower than 10 mm, for example about 8 mm. In this way the first beating surface 54 can transfer to the decorative layer 2 horizontal forces exerted to move horizontally the floor element 1 along the horizontal direction Z toward the adjacent floor element 1 and effecting the coupling via said translational horizontal movement.

Advantageously the first beating surface 54 comprises a soft coating for dampening the hammering force. For example, said soft coating may be made of rubber or a textile like felt.

The second beating surface 55 is parallel to the first beating surface 54. In the embodiment of FIG. 14, the second beating surface 55 is provided on the same body 53 portion of the first tool 50 and is opposite to the first beating surface 54. Within the scope of the present application "opposite on the same body portion" means that exist one straight line that is orthogonal to both the first beating surface 54 and the correspondent second beating surface 55.

It is to be noted that in the example shown in FIGS. 13 and 14 the first tool 50 comprises a couple of orthogonal first surfaces 54 and of correspondent orthogonal second surfaces 55.

The first tool 50 further comprises a handle 56. In a preferred embodiment, the first tool 50 is made of at least a polymeric material, preferably a thermoplastic material, for example polyethylene (PVC), polypropylene (PP), PVC, PET, ABS, PA.

FIG. 15 on a larger scale shows a cross section of an alternative embodiment the first tool 51 along the plane XV-XV of FIG. 13. In FIG. 15 is shown a first tool 51 according to an alternative embodiment wherein the first beating surface 54 is substantially equal to that of the embodiment shown in FIG. 14. Anyway, in this alternative embodiment the second beating surface 55 is provided on a different body portion of the correspondent first beating surface. Within the scope of the present application "not being opposite on different body portion" means that it doesn't exist one straight line that is orthogonal to both the first beating surface and the correspondent second beating surface. In fact, in this embodiment, the body 53 of the first tool 51 is conformed substantially in an S-shape and it is provided with the first beating surface 54 on a extremal portion of said body 53 and with the second beating surface 56 on the other extremal portion of the body 53. This solution is particularly effective when it is needed to hammer a floor element in a position of the room where the operation is difficult for the limited space, for example close to a wall.

FIG. 16 on a larger scale shows a cross section of the second tool 52 along the plane XVI-XVI of FIG. 13. The second tool 52 comprises a handle portion 57 and a plane portion 58. The plane portion 58 is provided with on one edge with a coupling element 59 adapted to be coupled with one correspondent coupling element 11,12 of the board 3. This second tool 52 is particularly useful to couple the transversal edges 28 of two floor elements 1 on a same row that is parallel to the longitudinal edges 10 of the floor elements 1. In this case the second tool 52 is coupled to the longitudinal edges 10, via its coupling element 59, of both the floor elements 1 so that during the translational horizontal movement along the direction Z to couple the transversal edges 28 it guides said translational movement of the floor elements 1.

Preferably the plane portion 58 of the second tool 52 comprises coupling elements 59 on each of its opposite edges. For example, a male coupling element along a first edge and a female coupling element along a second coupling edge.

The present invention is in no way limited to the hereinabove described embodiments, but such floor elements may be realized according to different variants without leaving the scope of the present invention.

Further, as is clear from the content of the description, the present invention relates to one or more of the items as listed below, numbered from 1 to 102:

1.—A floor element for forming a floor covering, wherein the floor element comprises a board having edges provided with coupling elements adapted to cooperate with coupling elements of an adjacent similar floor element in said floor covering wherein the coupling elements comprise at least one male part and at least one female part said male part being positioned along a first edge and protruding outwardly beyond an upper edge at said first edge, said female part being positioned along a second edge and extending inwardly beyond an upper edge at said second edge to thereby form a recess for at least partially receive the male part, wherein said recess comprises an inlet opening having a vertical breadth, with the characteristic that the ratio between the vertical breadth and the thickness of the board is more than 0.4.

2.—Floor element according to item 1, wherein said ratio between the vertical breadth and the thickness is preferably more than 0.45, more preferably more than 0.5, even more preferably about 0.53.

3.—Floor element according to any of the preceding items, wherein the ratio between the vertical breadth and the thickness of the board is comprised between 0.4 and 0.7, preferably between 0.5 and 0.6.

4.—Floor element according to any of the preceding items, wherein the vertical breadth of the inlet opening corresponds to the maximum breadth of the recess of the female part.

5.—Floor element according to any of the preceding items, wherein the vertical breadth is above 1.6 mm, preferably above 1.8 mm, more preferably above 2 mm.

6.—Floor element according to any of the preceding items, wherein between the upper border of the inlet opening of the recess and the upper edge of said first edge, is provided a distance.

7—Floor element according to item 6, wherein the ratio between said distance and the thickness of the board is below 0.2, preferably below 0.15.

8—Floor element according to item 6 or 7, wherein the ratio between said distance and the thickness of the board is comprised between 0.2 and 0.1.

9.—Floor element according to any of the items from 6 to 8, wherein said distance is below 0.9 mm, preferably below 0.6 mm.

10.—Floor element according to any of the items from 6 to 9, wherein said distance is comprised between 0.9 and 0.4 mm.

11.—Floor element according to any of the preceding items, wherein the recess comprises a first portion close to the inlet opening and a second portion close to the bottom of said recess, wherein said first portion is larger than the second portion.

12.—Floor element according to item 11, wherein said first portion extends toward the bottom of the recess for a deepness that is at least 0.3 times the whole maximum deepness of the recess, preferably at least 0.4 times, more preferably at least 0.5 times of the whole maximum deepness of the recess.

13.—Floor element according to any of the items 11 or 12, wherein the deepness of the first portion is more than 0.5 mm, preferably more than 0.75 mm, for example more than 1 mm.

14.—Floor element according to any of the items from 11 or 13, wherein the deepness of the first portion is comprised between 0.5 and 1.5 mm, preferably between 0.75 and 1.25 mm.

15.—Floor element according to any of the items from 11 or 14, wherein said first portion comprises an inclined upper surface descending toward the bottom of the recess.

16.—Floor element according to item 15, wherein said inclined upper surface is inclined with respect to the horizontal of an angle comprised between 30° and 50°, for example about 45°.

17.—Floor element according to any of the preceding items, wherein in a coupled condition of two of said adjacent floor elements, the coupling elements cooperate and preferably form locking surfaces limiting the mutual movement of said floor elements in vertical and/or one or more horizontal directions.

18.—Floor element according to any of the preceding items, wherein the male part and female part are disposed substantially along the whole length of the related edge.

19.—Floor element according to any of the preceding items, wherein the coupling elements are configured so that, in a coupled condition, the coupling is free from pretension.

20.—Floor element according to any of the preceding items, wherein the coupling elements are configured so that the coupling movement of the coupling element occurs without deformation of the coupling elements.

21.—Floor element according to any of the preceding items, wherein in the coupled condition a play is established between the coupling elements.

22.—Floor elements according to item 21, wherein said play is larger than 0.01 mm.

23.—Floor elements according to item 21 or 22, wherein said play and lower than 0.15 mm.

24.—Floor elements according to any of the items from 21 or 22, wherein said play is comprised between 0.03 and 0.1 mm.

25.—Floor element according to any of the preceding items, wherein said coupling elements are configured for being coupled each other by means of an angling motion around a horizontal axis parallel to the edges.

26.—Floor element according to any of the preceding items, wherein the coupling element are configured for being coupled by means of a translational motion in a horizontal direction.

27.—Floor element according to any of the preceding items, wherein the male and female parts are respectively shaped in form of tongue and groove.

28.—Floor element according to item 27, wherein the tongue comprises a horizontal extending lip and a downward projecting hump.

29.—Floor element according to item 28, wherein the horizontally extending lip has a maximum thickness comprised between 0.20 and 0.4 times the thickness of the board, preferably is 0.33 times the thickness of the board.

30—Floor element according to item 28 or 29, wherein the maximum thickness of the lip is comprised between 1 and 1.6 mm, preferably 1.3 mm.

31.—Floor element according to any of the items from 27 to 30, wherein in a coupled condition the tongue fits into the groove in such a way that a horizontal inoperative space is established between the tip of the tongue, in particular of the lip thereof, and the bottom of the groove, in particular of the recess thereof.

32.—Floor element according to any of the items from 27 to 31, wherein in a coupled condition the tongue fits into the groove in such a way that a vertical inoperative space is established between the lower surface of the tongue, in particular of the lip thereof, and the groove, in particular the recess thereof.

33.—Floor element according to any of the items from 1 to 24, wherein coupling element are configured for being coupled by means of a translational motion in a downward, e.g. vertical, direction.

34.—Floor element according to item 33, wherein the coupling elements comprise an upward-directed lower hook-shaped part which is situated on one edge, as well as a downward-directed upper hook-shaped part, which is situated on the opposite edge.

35.—Floor element according to item 34, wherein in a coupled position the downward-directed lip and the upward-directed cavity form the first locking surface for limiting mutual movement in a horizontal direction, and/or e second locking surface are formed to limit the mutual movement of the floor elements in the vertical direction.

36.—Floor element according to any of the preceding items, wherein the board is made of a polymeric material, preferably thermoplastic polymeric material.

37.—Floor element according to item 34, wherein the board is made of PVC either rigid or flexible.

38.—Floor element according to item 34, wherein the board comprises more than 30 wt % or more than 60% wt of filler materials.

39.—Floor element according to any of the preceding items, wherein the board comprises transversal notches separating adjacent portions of the board.

40.—Floor element according to any of the preceding items, wherein board has preferably a thickness comprised between 3.2 and 6 mm, more preferably about 4.

41.—Floor element according to any of the preceding items, comprising a decorative layer provided above the board.

42.—Floor element according to item 41, wherein decorative layer is made of a material that is different from the material of the board.

43.—Floor element according to item 41 or 42, wherein the coupling elements are wholly formed in said board.

44.—Floor element according to any of the items from 41 to 43, wherein the decorative layer comprises a ceramic tile.

45.—Floor element according to item 44, wherein the ceramic tile comprises a body made of porcelain, red body ceramic, stoneware, earthenware, or other sintered ceramic powders.

46.—Floor element according to any of the items from 41 to 45, wherein the decorative layer comprises an apparent porosity between 0.1% and 10% determined according to ASTM C373, more preferably between 2% and 8%, for example 6%.

47.—Floor element according to any of the items from 41 to 46, wherein the decorative layer comprises an apparent porosity lower than 15%, preferably lower than 10% measured according to ASTM C373.

48.—Floor element according to any of the items from 41 to 47, wherein the decorative layer has a volume of the open pores comprised between 0.01 cc (cubic centimeter) and 1 cc, more preferably between 0.10 cc and 0.90 cc, for example 0.60 cc.

49.—Floor element according to any of the items from 41 to 48, wherein the decorative layer comprises a lower surface that is substantially flat.

50.—Floor element according to any of the items from 41 to 49, wherein decorative layer has an upper face comprising a décor and wherein the décor is at least partially formed by a print.

51.—Floor element according to any of the items from 41 to 50, wherein decorative layer comprises a density as expressed by surface weight of at least 10 kg/sqm, preferably 15 kg/sqm, for example above 19 kg/sqm.

52.—Floor element according to any of the items from 41 to 51, wherein decorative layer comprises a density as expressed by surface weight of less than 35 kg/sqm, preferably below 30 kg/sqm, for example below 25 kg/sqm.

53.—Floor element according to any of the items from 41 to 52, wherein decorative layer has a thickness comprised between 4 and 15 mm.

54.—Floor element according to any of the items from 41 to 53, wherein decorative layer has a thickness for example above 6 mm, preferably above 7 mm, for example about 8 or about 10 mm.

55.—Floor element according to any of the items from 41 to 54, wherein decorative layer has a thickness lower than 20 mm, preferably 18 mm or lower, more preferably 13 mm or lower.

56.—Floor element according to any of the items from 41 to 55, wherein decorative layer comprises a planarity deviation below 1.5 mm, preferably below 1 mm, even more preferably below 0.8 mm.

57.—Floor element according to any of the items from 41 to 56, wherein the board one or more portions extending beyond the decorative layer.

58.—Floor element according to any of the items from 41 to 57, wherein the decorative layer is mounted on the board in such a way that when the floor elements are in a coupled condition an intermediate distance is established between the edges of adjacent decorative layers, while the edges of the underlying board are coupled to each other by means of the available coupling elements.

59.—Floor element according to any of the items from 41 to 58, wherein floor element comprises an intermediate layer disposed between the decorative layer and the board.

60.—Floor element according to item 58, wherein the intermediate layer comprises an adhesive or a resin that bonds together the decorative layer and the board.

61.—Floor element according to item 60, wherein the intermediate layer comprises a resin, for example a thermosetting resin or thermoplastic resin.

62.—Floor element according to item 61, wherein the intermediate layer comprises an epoxy resin.

63.—Floor element according to any of the items 61 or 62, wherein the resin material permeates a lower surface of the decorative layer.

64.—Floor element according to any of the items 61 or 63, wherein the resin comprises a viscosity at 20° C. below 1000 Pas, preferably below 800 Pas, more preferably below 600 Pas, for example approximately 400 Pas.

65.—Floor element according to any of the items 61 or 64, wherein the resin shows a shrinkage, after curing, comprised between 0.5 and 4% for example between 1 and 2%.

66.—Floor element according to any of the items 61 or 65, wherein the resin comprises a tensile strength between 50 and 90 MPa, more preferably between 60 and 80 MPa, for example 75 MPa.

67.—Floor element according to any of the items 61 or 66, wherein the resin comprises a compressive strength between 90 and 130 MPa, more preferably between 100 and 120 MPa, for example 110 MPa.

68.—Floor element according to any of the items 61 or 67, wherein the resin shows a hardness value of at least 50 measured on a Shore D scale.

69.—Floor element according to any of the items 61 or 68, wherein the resin covers at least a portion of the lower surface of the decorative layer, for example the majority, i.e. at least 50 percent, of the lower surface of said decorative layer, preferably the resin covers 80 percent or more of the lower surface of the decorative layer, for example it covers the 100 percent of the lower surface of the decorative layer.

70.—Floor element according to any of the items 61 or 69, wherein said resin compresses the decorative layer.

71.—Floor element according to any of the preceding items, wherein the floor element is rectangular and oblong in shape.

72.—Floor element according to any of the preceding items, wherein the floor element comprises a superficial area of less than 1.5 sqm, preferably less than 1 sqm, more preferably less than 0.4 sqm.

73.—Floor element according to any of the preceding items, wherein the floor element comprises edges having a maximum length of less than 1.5 m, preferably less than 0.9 m.

74.—A floor element for forming a floor covering, wherein this floor element comprises a first decorative layer made of a ceramic material and a second layer arranged below this decorative layer, wherein the second comprises a resin material that permeates a lower surface of the decorative layer.

75.—A floor element according to item 74, wherein the floor element comprises a third layer placed below the second layer.

76.—A floor element for forming a floor covering, wherein this floor element comprises a decorative layer made of a ceramic material and a board arranged below this decorative layer, wherein the floor element comprises a layer having a resin material disposed below the decorative layer, and wherein said resin compresses the decorative layer.

77.—A floor element according to item 76, wherein the floor element comprises a third layer placed below the second layer.

78.—A floor covering comprising a plurality of adjacent floor elements, wherein at least one of the floor elements is according to any of the items from 41 to 77 and wherein the floor covering comprises a grout filling an intermediate distance separating the decorative layers of the floor elements.

79—Floor covering according to item 78, wherein the grout is polymer-based.

80—Floor covering according to item 79, wherein the grout is epoxy based or acrylic based or urethane based or silicone based.

81.—Use of a resin material for bonding together a decorative layer made of a ceramic material and a board to form a floor element, wherein the resin material comprises a viscosity at 20° C. below 1000 Pas, preferably below 800 Pas, more preferably below 600 Pas, for example approximately 400 Pas.

82.—Use according to item 81, wherein the resin is an epoxy resin.

83.—A method for manufacturing a floor element comprising the steps of: providing a decorative layer made of a ceramic material; providing a board; providing a resin material for bonding the decorative layer and the board together; pressing the layers together for forming the floor element such that the resin material permeates the ceramic layer.

84.—Method according to item 83, wherein the step of providing the decorative layer comprises a step of brushing and/or roughing the lower surface of the decorative layer.

85.—Method according to item 83 or 84, wherein the method comprises a step of annealing the board.

86.—Method according to any of the items from 83 to 85, wherein the method comprises a step of treating the upper surface of the board.

87.—Method according to item 86, wherein said step of treating the upper surface of the board comprises the step of roughing the upper surface of the board, for example a sending step, brushing step, grinding step.

88.—Method according to any of the items from 83 to 87, wherein the step of providing the resin comprises the step of applying a non-cured resin on at least a surface of the decorative layer and/or of the board.

89.—Method according to any of the items from 83 to 88, wherein during the pressing step it is exerted onto the layers a pressure of at least 350 kg/sqm, more preferably at least 370 kg/sqm.

90.—Method according to any of the items from 83 to 89, wherein during the pressing step, the pressure is kept for a pressing time of more than 1 second, preferably more than 10 seconds, for example 30 seconds.

91.—Method according to any of the items from 83 to 87, wherein the method comprises a step of stocking the floor elements for a stocking time in order to allow the resin to at least partially cure before being, packaged, transported and/or used in a floor covering.

92.—Method according to any of the items from 91, wherein said stocking time is at least 0.5 h, preferably more than 1 h, for example 2 h.

93.—A method for manufacturing a floor element comprising the steps of: providing a decorative layer made of a ceramic material; providing a board; providing a resin material for bonding the decorative layer and the board together; cure the resin; promote the shrinkage of the resin.

94.—A tool suitable for installing a floor covering having floor elements, wherein the floor elements comprise a decorative layer and a board disposed below the decorative layer and wherein the board having edges provided with coupling elements adapted to cooperate with coupling elements of an adjacent similar floor element in said floor covering, wherein the first tool comprises a body having first beating surface adapted to contact a surface of the decorative layer, and at least a second beating surface adapted to be hammered.

95.—Tool according to item 94, wherein the first beating surface is adapted to contact the surface of an edge of the decorative layer.

96.—Tool according to item 94 or 95, wherein the first beating surface has a vertical dimension substantially equal or lower than the thickness of the decorative layer, for example said vertical dimension is lower than 15 mm, preferably lower than 10 mm, for example about 8 mm.

97.—Tool according to any of the items 94 to 96, wherein the first beating surface comprises a soft coating, for example, said soft coating is be made of rubber or a textile like felt.

98.—Tool according to any of the items 94 to 97, wherein the second beating surface is provided on the same body portion of the first tool and is opposite to the first beating surface.

99.—Tool according to any of the items 94 to 97, wherein the second beating surface is provided on a different body portion of the correspondent first beating surface.

100.—A tool suitable for installing a floor covering, wherein the floor covering comprises a board having edges provided with coupling elements adapted to cooperate with coupling elements of an adjacent similar floor element in said floor covering, wherein the second tool comprises an handle portion and a plane portion provided with at least one edge and wherein said edge is provided with a coupling element to be coupled with at least one coupling element of the board.

101.—Tool according to item 100, wherein the plane portion of the second tool comprises coupling elements on each of its opposite edges, preferably, a male coupling element along a first edge and a female coupling element along a second coupling edge.

102.—A kit for installing a floor covering having floor elements, wherein the floor elements comprise a decorative layer and a board disposed below the decorative layer and wherein the board having edges provided with coupling elements adapted to cooperate with coupling elements of an adjacent similar floor element in said floor covering, wherein the kit comprises at least one tool according to any of the items from 94 to 99 and at least one tool according to any of the items from 100 to 101.

The present invention is in no way limited to the hereinabove described embodiments, but such system may be realized according to different variants without leaving the scope of the present invention. While certain systems and methods related to composite tile systems and methods have been disclosed in some exemplary forms, many modifications, additions, and deletions may be made without departing from the spirit and scope of the system, method, and their equivalents. The embodiments disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented herein. It is important, therefore, that the claims be regarded as including such equivalent constructions.

What is claimed is:

1. A floor element for forming a floor covering, wherein the floor element comprises:
   a board; and
   a decorative layer above the board,
   wherein the board comprises edges provided with coupling elements adapted to cooperate with coupling elements of an adjacent similar floor element in said floor covering,
   wherein the coupling elements comprise at least one male part and at least one female part,
   wherein the male part is positioned along a first edge of the board and protrudes outwardly beyond an upper edge of the first edge of the board,
   wherein the female part is positioned along a second edge of the board and extends inwardly beyond an upper edge of the second edge of the board to thereby form a recess for receiving at least part of the male part,
   wherein the recess comprises an inlet opening having a vertical breadth,
   wherein the board has a thickness in a range of from 3.2 mm to 6 mm,
   wherein a ratio between the vertical breadth of the inlet opening and the thickness of the board is more than 0.4,
   wherein the decorative layer comprises a ceramic tile, and
   wherein the decorative layer is mounted on the board in such a way that two floor elements in a coupled condition have an intermediate distance between the edges of adjacent decorative layers.

2. The floor element according to claim 1, wherein the ratio between the vertical breadth of the inlet opening and the thickness of the board is 0.45 or greater.

3. The floor element according to claim 1, wherein there is a distance between the upper edge of the inlet opening of the recess and the upper edge of the first edge of the board, and wherein a ratio between the distance between the upper edge of the inlet opening and the upper edge of the first edge of the board and the thickness of the board is 0.2 or less.

4. The floor element according to claim 1, wherein the recess comprises a first portion close to the inlet opening and a second portion close to the bottom of the recess, wherein the first portion is larger than the second portion, wherein the recess has a maximum depth that is measured starting from the inlet opening to the bottom of the recess, and wherein the first portion extends toward the bottom of the recess for a depth that is at least 0.3 times the maximum depth of the recess.

5. The floor element according to claim 1, wherein there is play between the coupling elements when the coupling elements are coupled.

6. The floor element according to claim 5, wherein the play is comprised from 0.03 mm to 0.1 mm.

7. The floor element according to claim 1, wherein the coupling elements are configured for being coupled to each other by an angling motion around a horizontal axis parallel to the edges.

8. The floor element according to claim 1, wherein the board comprises a polymeric material.

9. The floor element according to claim 8, wherein the board comprises a rigid PVC, a flexible PVC, or a combination thereof.

10. The floor element according to claim 1, wherein the coupling elements are wholly formed in the board.

11. The floor element according to claim 1, wherein the floor element comprises an intermediate layer disposed between the decorative layer and the board, and wherein the intermediate layer comprises a resin.

12. The floor element according to claim 11, wherein the resin permeates a lower surface of the decorative layer.

13. The floor element according to claim 11, wherein the resin compresses the decorative layer.

14. The floor element according to claim 1, wherein the floor element is rectangular and oblong in shape.

15. The floor element according to claim 1, wherein the floor element comprises edges having a length of 1.5 m or less.

16. A floor element for forming a floor covering comprising:
   a ceramic tile;
   a board disposed below the ceramic tile; and
   an intermediate layer between the board and the ceramic tile,
   wherein the board comprises coupling elements adapted to cooperate with coupling elements of an adjacent similar floor element in the floor covering,
   wherein the intermediate layer comprises resin, and
   wherein said resin compresses the ceramic tile.

17. A floor covering comprising:
   a plurality of adjacent floor elements,
   wherein at least one of the floor elements comprises:
      a ceramic tile;
      a board disposed below the ceramic tile; and
      an intermediate layer between the board and the ceramic tile, wherein the board comprises edges having coupling elements adapted to cooperate with coupling elements of an adjacent similar floor element in the floor covering, wherein the intermediate layer comprises a resin, wherein the resin compresses the ceramic tile, and wherein the floor covering comprises a grout filling an intermediate distance separating decorative layers of the floor elements.

18. The floor covering according to claim 17, wherein the grout is epoxy based, acrylic based, urethane based, silicone based, or a combination thereof.

* * * * *